United States Patent
Fujita

(10) Patent No.: US 6,753,839 B2
(45) Date of Patent: Jun. 22, 2004

(54) ELECTRO-OPTICAL PANEL AND ELECTRONIC DEVICE

(75) Inventor: Shin Fujita, Suwa (JP)

(73) Assignee: Seiko Epson Corporation, Tokyo (JP)

(*) Notice: Subject to any disclaimer, the term of this patent is extended or adjusted under 35 U.S.C. 154(b) by 201 days.

(21) Appl. No.: 10/014,439

(22) Filed: Dec. 14, 2001

(65) Prior Publication Data

US 2002/0101398 A1 Aug. 1, 2002

(30) Foreign Application Priority Data

Dec. 14, 2000 (JP) .......................................... 2000-380517
Oct. 25, 2001 (JP) .......................................... 2001-328325

(51) Int. Cl.[7] ............................................... G09G 3/36
(52) U.S. Cl. ........................................ 345/92; 345/100
(58) Field of Search ..................... 345/90, 92, 93, 345/98, 100, 204; 349/42, 48

(56) References Cited

U.S. PATENT DOCUMENTS

| | | | |
|---|---|---|---|
| 5,742,363 A | | 4/1998 | Bae |
| 5,745,090 A | * | 4/1998 | Kim et al. ..................... 345/90 |
| 6,066,860 A | | 5/2000 | Katayama et al. |
| 6,266,038 B1 | * | 7/2001 | Yoshida et al. ................ 345/92 |
| 6,456,267 B1 | * | 9/2002 | Sato et al. ..................... 345/92 |
| 6,456,269 B2 | * | 9/2002 | Hirakata ........................ 345/92 |

FOREIGN PATENT DOCUMENTS

| | | |
|---|---|---|
| EP | 0 375 233 A2 | 12/1989 |
| EP | 0 490 640 A1 | 12/1991 |
| EP | 1 130 565 A1 | 9/2001 |
| GB | 2 304 963 A | 3/1997 |
| JP | 63-082177 | 4/1988 |
| JP | 02-178632 | 7/1990 |
| JP | 02-285327 | 11/1990 |
| JP | 04-190329 | 7/1992 |
| JP | 09-068726 | 3/1997 |
| JP | 09-189922 | 7/1997 |
| JP | 11-160676 | 6/1999 |

* cited by examiner

Primary Examiner—Chanh Nguyen
Assistant Examiner—Paul A. Bell
(74) Attorney, Agent, or Firm—Oliff & Berridge, PLC

(57) ABSTRACT

The present invention provides an electro-optical panel that is capable of effectively exhibiting the features of the construction in which two transistor elements are used per pixel, and an electronic device using the electro-optical panel. A pixel includes a P-channel thin-film transistor (TFT) in which the gate electrode is connected to a scanning line, and an N-channel TFT in which the gate electrode is connected to a scanning line. When the P-channel TFT and the N-channel TFT are turned on, the voltage of an image signal supplied to a data line is written into a holding capacitor HC and a holding capacitor LC. The holding capacitor HC is connected to the drain electrode of the N-channel TFT. Also, the holding capacitor HC is connected to the drain electrode of the P-channel TFT via a wiring line L. Since the wiring line L is formed of a low-resistance material, the time constant when the image signal is written into the holding capacitor HC via the P-channel TFT can be decreased.

24 Claims, 25 Drawing Sheets

100: LIQUID-CRYSTAL DISPLAY PANEL
104: POLARIZER
102: OPPOSING SUBSTRATE
101: COMPONENT SUBSTRATE
120: DRIVING CIRCUIT GROUP
103: POLARIZER

100: LIQUID-CRYSTAL DISPLAY PANEL

ELECTRO-OPTICAL PANEL AND ELECTRONIC DEVICE

BACKGROUND OF THE INVENTION

1. Field of Invention

The present invention relates to an electro-optical panel having two transistor elements per pixel, and to an electronic device using the electro-optical panel.

2. Description of Related Art

Currently, a conventional liquid-crystal display panel include a component substrate, an opposing substrate, and a liquid crystal held between these substrates. A plurality of data lines and a plurality of scanning lines are formed in an image display area of the component substrate, and a thin-film transistor (TFT) is provided in each of the pixels arranged in a matrix in such a manner as to correspond to the intersections thereof.

Various types of pixel circuit construction have been proposed, and in one such pixel construction, a P-channel TFT and an N-channel TFT are used in combination. FIG. 26 shows an exemplary circuit diagram having a circuit corresponding to one pixel of a component substrate used in a conventional liquid-crystal device. In this figure, the source electrodes of a P-channel TFT 1 and an N-channel TFT 2 are connected to a data line 6, whereas the gate electrode of the P-channel TFT 1 is connected to a scanning line 5a and the gate electrode of the N-channel TFT 2 is connected to a scanning line 5b.

Also, the drain electrodes of the P-channel TFT 1 and the N-channel TFT 2 are connected to a pixel electrode 3, and the drain electrode of the N-channel TFT 2 is connected to a holding capacitor 4. Here, the pixel electrode 3, the common electrode formed on the opposing substrate, and the liquid crystal forms a liquid-crystal capacitor.

In such a pixel construction, an image signal supplied to the data line 6 can be written into a liquid-crystal capacitor 7 and the holding capacitor 4 when the P-channel TFT 1 and the N-channel TFT 2 are turned on. Then, when the P-channel TFT 1 and the N-channel TFT 2 are turned off, the voltage written into the liquid-crystal capacitor 7 and the holding capacitor 4 is held. Since the transmittance of the liquid crystal varies according to the applied voltage, it become possible to produce a gray-scale display.

Here, the reason the holding capacitor 4 is provided in addition to the liquid-crystal capacitor 7 is that a decrease in the applied voltage to the liquid crystal due to off-leakage of the P-channel TFT 1 and the N-channel TFT 2 is prevented and crosstalk in the vertical direction is prevented.

In the above-described pixel construction, the writing path of the image signal with respect to the holding capacitor 4 differs between a case in which the image signal passes through the P-channel TFT 1 and a case in which the image signal passes through the N-channel TFT 2. In other words, as shown in FIGS. 27 and 28, when the image signal passes through the P-channel TFT 1, the image signal is written into the holding capacitor 4 via the pixel electrode 3, whereas when the image signal passes through the N-channel TFT 2, the image signal is directly written into the holding capacitor 4 without passing through the pixel electrode 3.

FIG. 27 shows an exemplary circuit diagram having an equivalent circuit for the case in which an image signal is written into the holding capacitor 4 via the N-channel TFT 2. FIG. 28 shows a circuit diagram having an equivalent circuit for the case in which an image signal is written into the holding capacitor 4 via the P-channel TFT 1. In these figures, reference character Ron denotes an ON resistance of the P-channel TFT 1 and the N-channel TFT 2. Reference character Rito denotes the equivalent resistance of the pixel electrode 3. Reference character Ch denotes the capacitance value of the holding capacitor 4.

As is clear from these figures, the time constant when the image signal passes through the N-channel TFT 2 is "Ron·Ch", whereas the time constant when the image signal passes through the P-channel TFT 1 is "(Ron+Rito)·Ch". Here, the equivalent resistance Rito of a pixel electrode 8 is greater than the ON resistance Ron.

Therefore, when the image signal is written from the P-channel TFT 1, the time constant becomes greater than in the case in which the image signal is written from the N-channel TFT 2. For this reason, when the difference between the voltage of the holding capacitor 4 and the voltage of the image signal is large, the image signal cannot be sufficiently written when it passes through the P-channel TFT 1, presenting the problem that a large contrast ratio cannot be obtained.

In particular, when a high-resolution image is to be displayed, the number of the scanning lines 5a and 5b, and the data lines 6 is increased. The greater the number of the scanning lines 5a and 5b and the data lines 6 is increased, the shorter the selection period of the scanning lines 5a and 5b and the data lines 6 becomes. As a result, insufficient writing due to the difference in the time constants becomes a serious problem.

SUMMARY OF THE INVENTION

The present invention has been made in view of the above-described circumstances. An object of the present invention is to provide an electro-optical panel which is capable of effectively exhibiting the features of the construction in which two transistor elements are used per pixel, and an electronic device using the electro-optical panel.

To achieve the above-mentioned object, the electro-optical panel of the present invention can include a component substrate, an opposing substrate, and an electro-optical material held between the component substrate and the opposing substrate. The component substrate can further include a plurality of scanning lines which are provided as pairs, a plurality of data lines, pixel electrodes which are arranged in a matrix in such a manner as to correspond to the intersections of the scanning lines and the data lines and which are each arranged between one of the scanning lines and the other of the scanning lines which are provided as a pair, a first transistor element in which the gate electrode is connected to one of the scanning lines which are provided as a pair, the data lines are connected to the source electrode, and the pixel electrode is connected to the drain electrode. The component substrate can further include a second transistor element in which the other one of the scanning lines in the pair is connected to the gate electrode, the data lines are connected to the source electrode, and the pixel electrode is connected to the drain electrode, a capacitance element which is connected to the drain electrode of the second transistor element and wiring which connects the drain electrode of the first transistor element to the drain electrode of the second transistor element.

According to the present invention, since wiring for connecting the drain electrode of the first transistor element to the drain electrode of the second transistor element is provided, the drain electrode of the first transistor element is connected to the drain electrode of the second transistor element through a different path from the pixel electrode. Therefore, since the equivalent resistance between the two drain electrodes is smaller than that in the case where wiring is not provided, the time constant when a signal is written into the holding capacitor via the first transistor element can be decreased.

Here, the resistance of the wiring is preferably smaller than the equivalent resistance of the pixel electrode which connects the drain electrode of the first transistor element to the drain electrode of the second transistor element. Furthermore, from the viewpoint of a lower resistance, it is preferable for the wiring that a high-melting point material, such as aluminum, silver, or chromium, be used. By decreasing the resistance of the wiring in this manner, the time constant when a signal is written into the holding capacitor via the first transistor element can be decreased even more. When the selection period of the scanning lines and the data lines is short, the image signal supplied to the data lines must be written into the holding capacitor in a short time. If wiring which causes the section between drain electrodes to be short-circuited is provided in the manner described above, it is possible to decrease the time constant when the image signal is written into the holding capacitor via the first transistor element.

As a result, since the image signal can be sufficiently written into the holding capacitor in a short time, a high contrast ratio can be obtained, and a vivid image can be displayed. Also, even if the number of scanning lines and data lines is increased and the selection period becomes shorter, since the image signal can be reliably written into the holding capacitor in such a selection period, it becomes possible to display a high-resolution image with high quality.

Furthermore, display variations which occur due to the difference in time constants can be greatly reduced. As a result of the writing into the holding capacitor becoming easier, the signal amplitude of the image signal to be supplied to the data lines can be decreased. Also, as a consequence of this, the amplitude of the image signal can be decreased. As a result, the power-supply voltage of the driving circuit can be decreased, allowing the power consumption to be reduced.

Also, a common electrode and a lattice-shaped black matrix may be formed on the opposing substrate, and the wiring may be arranged in such a manner as to overlap with the black matrix. Since light is not transmitted through the wiring portion, if the wiring is provided simply, the aperture ratio will be decreased. If the wiring is arranged so as to overlap with the black matrix as in the present invention, the writing time constant can be decreased without reducing the aperture ratio.

Next, the electro-optical panel of the present invention can include a component substrate, an opposing substrate, and an electro-optical material held between the component substrate and the opposing substrate The component substrate can further include a plurality of scanning lines which are provided as pairs, a plurality of data lines, pixel electrodes which are arranged in a matrix in such a manner as to correspond to the intersections of the scanning lines and the data lines and which are each arranged between one of the scanning lines which are provided as a pair and the other of the scanning lines, a first transistor element in which one of the scanning lines in the pair is connected to the gate electrode, and the data lines are connected to the source electrode. The component substrate can further include a second transistor element in which the other of the scanning lines provided in the pair is connected to the gate electrode, and the data lines are connected to the source electrode, and wiring which connects the drain electrode of the first transistor element to the drain electrode of the second transistor element, wherein either one of the drain electrode of the first transistor element and the drain electrode of the second transistor element is connected to the pixel electrode.

According to the present invention, the drain electrode of either one of the first transistor element and the second transistor element is connected to a pixel electrode. Since wiring for connecting each drain electrode is provided separately, it becomes possible to apply a voltage corresponding to an image signal to the pixel electrode. Furthermore, the connection between the drain electrode and the pixel electrode is required at only one place.

Here, the component substrate may comprise a capacitance element which is connected to the drain electrode of the second transistor element. In this case, the image signal is written into the holding capacitor via the wiring.

In the above-described electro-optical panel of the present invention, preferably, the first and second transistor elements comprise a polysilicon layer formed of a source region, a gate region, and a drain region, and a gate insulating film formed on the polysilicon layer, the drain electrode is connected to the drain region via a first contact hole formed in the gate insulating film, the pixel electrode and the drain electrode are connected to each other via a second contact hole, and the resistance of the wiring is smaller than the equivalent resistance of the first contact hole or the equivalent resistance of the second contact hole. According to the present invention, by decreasing the resistance of the wiring, the time constant when a signal is written into the holding capacitor via the first transistor element can be decreased even more.

Preferably, the first and second transistor elements comprise a polysilicon layer formed of a source region, a gate region, and a drain region, and a gate insulating film formed on the polysilicon layer, the drain electrode is connected to the drain region via a first contact hole formed in the gate insulating film, the pixel electrode and the drain electrode are connected to each other via a second contact hole, a common electrode and a lattice-shaped black matrix are formed on the opposing substrate, and the second contact hole is provided in such a manner as to overlap with the black matrix. Since the contact state of the second contact hole with the electro-optical material differs from that of the pixel electrode, for the region concerned, the state of the electric field applied to the electro-optical material differs from that of the pixel electrode. However, according to the present invention, since the second contact hole is covered with the black matrix, the region concerned, having a different brightness, can be concealed from the view.

The first transistor element may comprise a P-type thin-film transistor element, and the second transistor element may comprise an N-type thin-film transistor element. Conversely, the first transistor element may comprise an N-type thin-film transistor element, and the second transistor element may comprise a P-type thin-film transistor element.

Furthermore, preferably, the capacitance element is formed between a capacitor line formed in proximity to the other scanning line and the drain region of the second transistor element.

In order to construct a holding capacitor, two opposing electrodes are required. In this example, since one of the electrodes is also used for the drain region of the second transistor element, there is no need to provide a contact for connecting one of the electrodes to the drain region. Consequently, the manufacturing process can be simplified, and an area for providing the holding capacitor can be reduced to improve the aperture ratio.

In the present invention, the pixel electrode can be formed of a light-transmitting conductive film, for example.

Also, in the present invention, the pixel electrode may be formed of a light-transmitting conductive film, may have the electro-optical material side positioned on one of the sides thereof, and may comprise a reflection layer which reflects incident light on the other side. In this case, the wiring is formed on the side opposite to the pixel electrode with respect to the reflection layer. Incident light is not transmitted through the space on the side opposite to the pixel electrode of the reflection layer, and by providing wiring in this space, the writing time constant of the image signal can be decreased without decreasing the aperture ratio.

Here, in a case where an opening through which light is transmitted is provided in a portion of the reflection layer, the wiring is preferably arranged in such a manner as not to overlap with the opening. Since the opening causes light to be transmitted therethrough, if wiring is provided in this region, the aperture ratio is decreased. However, according to the present invention, the aperture ratio is not decreased.

In the present invention, the pixel electrode may be formed of a light-reflecting conductive film.

Furthermore, the electro-optical panel of the present invention may be such that a scanning-line driving circuit for selecting the scanning lines, which form a pair, in sequence, and a data-line driving circuit for supplying an image signal to each of the data lines are formed on the component substrate.

Next, the electronic device of the present invention comprises the above-described electro-optical panel, and examples thereof include a viewfinder used in a video camera, a portable phone, a notebook-sized computer, and a video projector.

BRIEF DESCRIPTION OF THE DRAWINGS

The invention will be described with reference to the accompanying drawings, in which like elements are referred to with like number, and in which.

DETAILED DESCRIPTION OF PREFERRED EMBODIMENTS

First, a transmission-type liquid-crystal device will be described as an example of an electro-optical device.

Figure 1:
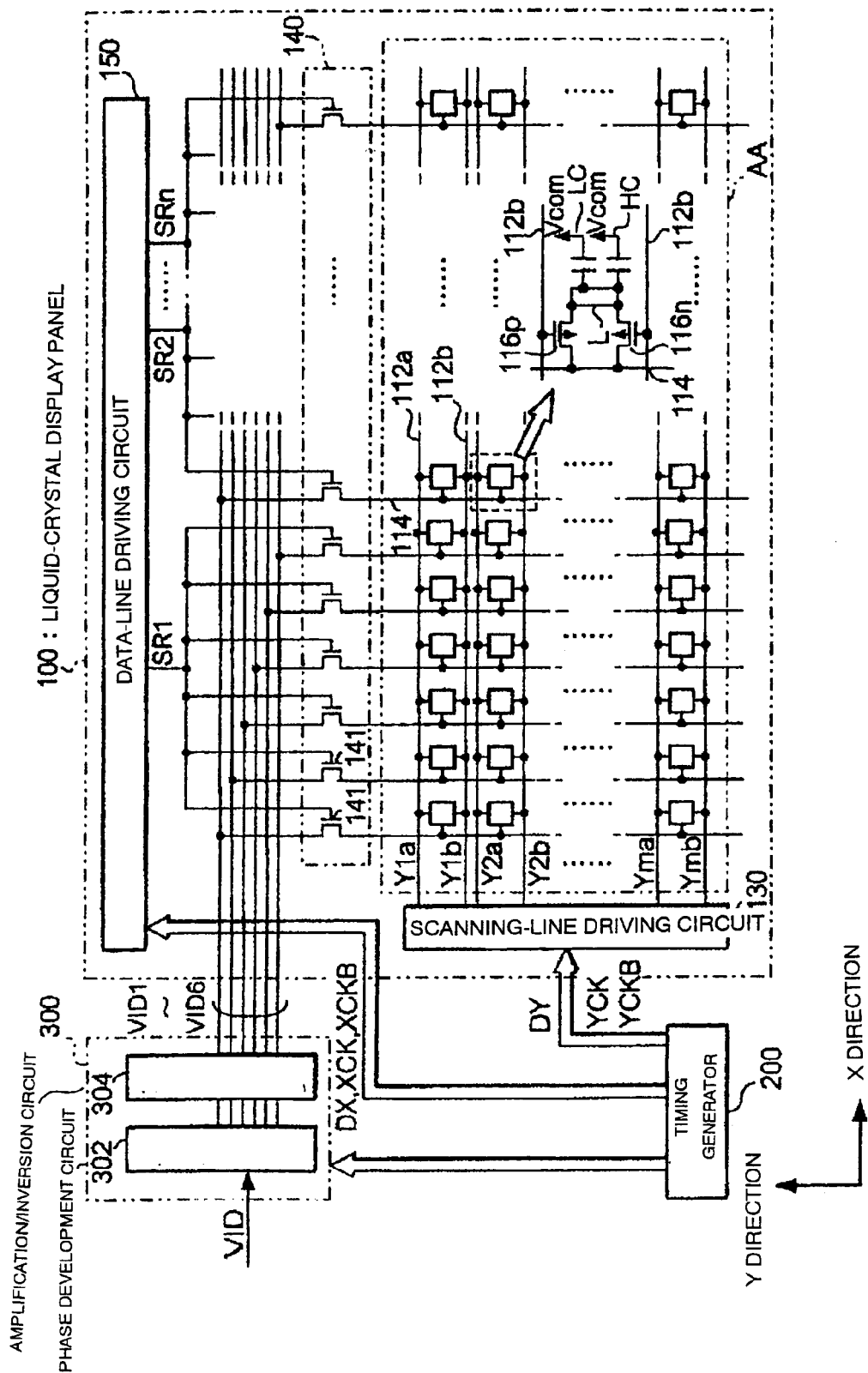
FIG. 1 is an exemplary block diagram showing the overall construction of a liquid-crystal device according to the present invention.

FIG. 1 shows an exemplary block diagram having the electrical construction of a liquid-crystal device. As shown in this figure, the liquid-crystal device can include a liquid-crystal display panel 100, a timing generator 200, and an image signal processing circuit 300. Furthermore, the liquid-crystal device can include a backlight (not shown) on the side opposite to the display surface of the liquid-crystal display panel 100, so that light from the backlight is modulated by the liquid-crystal display panel 100 and is made to exit from the display surface.

The timing generator 200 outputs a timing signal (to be described later as necessary) used in each section. Furthermore, a phase development circuit 302 inside the image signal processing circuit 300 develops an image signal VID of one system, when that image signal is input, into image signals of N phases (N=6 in the figure) and outputs them in parallel, and corresponds to a serial-to-parallel conversion circuit for converting an image signal into N parallel signals. Here, the reason the image signal is developed into N phases is that the applied time of the image signal in the source electrode of a TFT which functions as a switching element is increased by a sampling circuit (to be described in greater detail later), so that a sufficient writing time with respect to the wiring capacitance of a data line is secured.

Meanwhile, among the image signals which have been phase-developed, an amplification/inversion circuit 304 inverts image signals which need to be inverted and, thereafter, appropriately amplifies them and supplies them as image signals VID1 to VID6 in a parallel manner to the liquid-crystal display panel 100. Whether or not the image signal should be inverted is generally determined according to whether the application method for a data signal is: (1) polarity inversion in units of scanning lines; (2) polarity inversion in units of data signal lines; (3) polarity inversion in units of pixels; or (4) polarity inversion in units of frames, and the inversion cycle thereof is set to one horizontal scanning period or one vertical scanning period.

Furthermore, the timings at which the phase-developed image signals VID1 to VID6 are supplied to the liquid-crystal display panel 100 are set to be the same in the liquid-crystal device shown in FIG. 1, but may be shifted in sequence in synchronization with the dot-clock. In this case, the image signals of N phases may be sampled in sequence by the sampling circuit (to be described in greater detail below).

Figure 2:
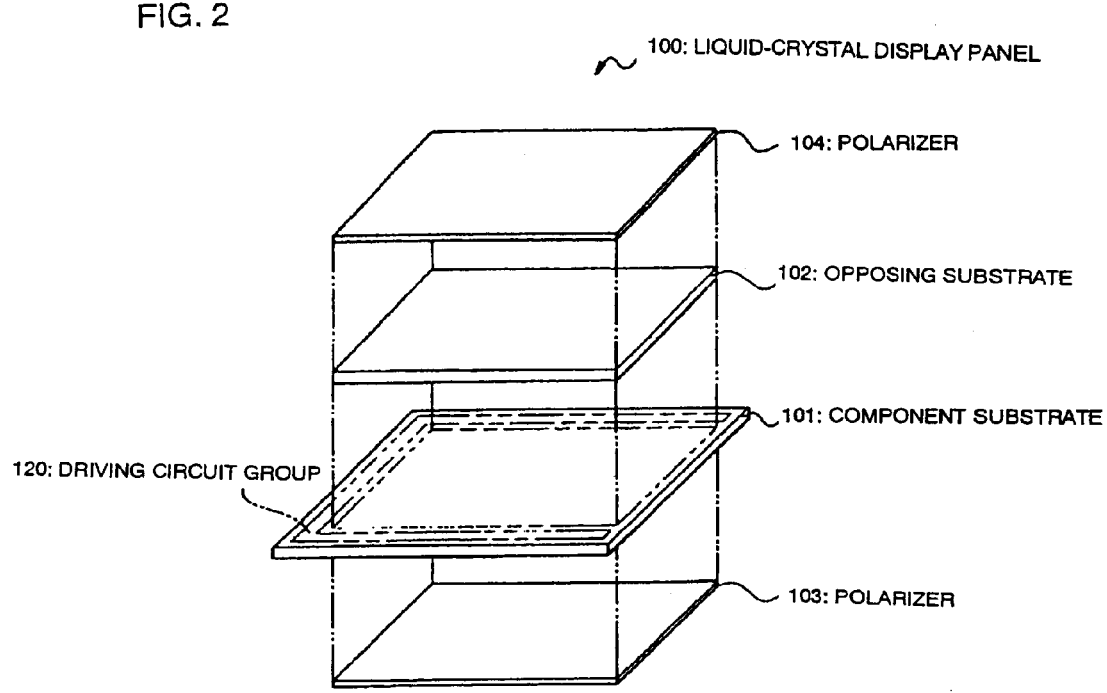
FIG. 2 is a perspective view illustrating the construction of a liquid-crystal display panel.
Figure 3:
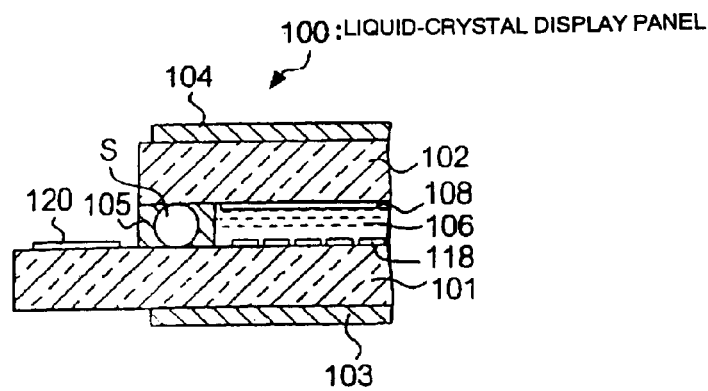
FIG. 3 is a partial sectional view illustrating the construction of the liquid-crystal display panel.

Next, the overall construction of the liquid-crystal display panel 100 will be described with reference to FIGS. 2 and 3. FIG. 2 is a perspective view illustrating the construction of the liquid-crystal display panel 100, while FIG. 3 is a partial sectional view illustrating the construction of the liquid-crystal display panel 100. As shown in these figures, the liquid-crystal display panel 100 is constructed in such a way that a component substrate 101, such as glass or semiconductor, on which a pixel electrode 118, etc., is formed, and a transparent opposing substrate 102, such as glass, on which a common electrode 108 etc., is formed, are laminated together, with a fixed spacing maintained therebetween by a sealing material 105 into which a spacer S is mixed, so that their electrode-formed surfaces oppose each other, and a liquid crystal 106 is sealed in this spacing.

On the outside of the sealing material 105, which is the side that the component substrate 101 opposes, a group of driving circuits 120 including a scanning-line driving circuit 130, a sampling circuit 140, and a data-line driving circuit 150, etc., are formed. Furthermore, an external connection electrode (not shown) is formed therein, so that various signals from the timing generator 200 and the image signal processing circuit 300 are input thereto. The common electrode 108 of the opposing substrate 102 is electrically connected to the wiring which extends from the external connection electrode of the component substrate 101 by a conducting material provided at at least one place among four corners in the laminated portion with the component substrate 101.

In addition, firstly, color filters which are arranged, for example, in a stripe shape, in a mosaic shape, in a triangle shape, etc., can be provided on the opposing substrate 102 according to the application of the liquid-crystal display panel 100. Secondly, a black matrix, such as a resin black, in which, for example, a metal material such as chromium or nickel, carbon, or titanium is dispersed in a photoresist, is provided on the opposing substrate 102. Thirdly, a backlight which illuminates light onto the liquid-crystal display panel 100 is provided on the opposing substrate 102. In particular, in the case of the application of color light modulation, a color filter is not formed, and a black matrix is provided on the opposing substrate 102.

In addition, on each opposing surface of the component substrate 101 and the opposing substrate 102, an orientation film which is subjected to a rubbing process in a predetermined direction is provided, whereas, on each rear side thereof, polarizers 103 and 104 corresponding to the orientation direction are provided by laminating or with a spacing. However, if a polymer-dispersed-type liquid crystal which is dispersed as fine particles into a polymer is used as the liquid crystal 106, since the above-mentioned orientation film and polarizers are unnecessary, the light efficiency is increased, and this is advantageous from the viewpoint of higher luminance and lower power consumption.

Referring back to FIG. 1, the electrical construction of the liquid-crystal display panel 100 will now be described. On the component substrate 101 of the liquid-crystal display panel 100, an image display area AA is formed. A plurality of pairs of scanning lines are arranged and formed therein in parallel along the X direction in the figure. In the following description, in order that a pair of scanning lines is identified, one of the scanning lines is referred to as a scanning line 112a, and the other is referred to as a scanning line 112b. Also, a plurality (6n) of data lines 114 are formed in parallel along the Y direction intersecting at right angles to the scanning lines 112a and 112b.

Then, a portion surrounded by these scanning line 112a and 112b and the data lines 114 becomes one pixel. Therefore, each pixel is arranged in a matrix in such a manner as to correspond to each intersection of the scanning lines 112a and 112b and the data lines 114.

Each pixel includes a P-channel TFT 116p, an N-channel TFT 116n, a liquid-crystal capacitor LC, a holding capacitor HC, and a wiring line L. The gate electrode of the P-channel TFT 116p is connected to the scanning line 112a, the source electrode thereof is connected to the data line 114, and the drain electrode thereof can be connected to a pixel electrode 118. Meanwhile, the gate electrode of the N-channel TFT 116n is connected to the scanning line 112b, the source electrode thereof is connected to the data line 114, and the drain electrode thereof is connected to the pixel electrode 118.

Furthermore, one end of the holding capacitor HC is connected to the drain electrode of the N-channel TFT 116n, and a common electrode voltage Vcom is supplied to the other end of the holding capacitor HC so that the same electrical potential as that of the common electrode 108 is reached.

In addition, the wiring line L connects the drain electrode of the P-channel TFT 116p to the drain electrode of the N-channel TFT 116n.

In such a pixel construction, in a period in which a concerned pixel is selected, a scanning-line signal at an L level is supplied to the scanning line 112a, a scanning-line signal at an H level is supplied to the scanning line 112b, and an image signal is supplied to the data line 114. In the concerned period, both the P-channel TFT 116p and the N-channel TFT 116n are turned on, and the image signal is written into the liquid-crystal capacitor LC and the holding capacitor HC.

Next, the driving circuit group 120 can include the scanning-line driving circuit 130, the sampling circuit 140, and the data-line driving circuit 150, and is formed on the component substrate 101 in the manner described above. These circuits are formed by using the manufacturing process common to the TFTs of the pixels. As a result, this can be advantageous in terms of integration, manufacturing cost, etc. Although in this example, a description is given by assuming that the data-line driving circuit 150 and the sampling circuit 140 are separate bodies, it is also to be understood that the two may be considered as one body so as to be considered as a data-line driving circuit for driving the data line 114.

The scanning-line driving circuit 130 has a shift register and sequentially outputs, to each scanning line 112, scanning-line signals Y1a, Y1b, Y2a, Y2b, ..., Yma, Ymb (selection signals) on the basis of a Y clock signal YCK, an inverted Y clock signal YCKB thereof, a Y transfer start pulse DY, etc., from the timing generator 200.

Meanwhile, the sampling circuit 140 is such that 6 data lines 114 are formed as one group, and that the image signals VID1 to VID6 are sampled and supplied to the data line 114 belonging to these groups, respectively, in accordance with sampling signals SR1 to SRn. In the sampling circuit 140, a switch 141 formed of a TFT is provided at one end of each data line 114, the source electrode of each switch 141 is connected to a signal line to which one of the image signals VID1 to VID6 is supplied, and the drain electrode of each switch 141 is connected to one data line 114. Furthermore, the gate electrode of each switch 141 connected to the data line 114 belonging to each group is connected to one of the signal lines to which the sampling signals SR1 to SRn are supplied in such a manner as to correspond to that group. Since the image signals VID1 to VID6 are supplied simultaneously in the manner described above, the signals are sampled simultaneously in accordance with the sampling signal SR1.

Also, the data-line driving circuit 150 sequentially outputs the sampling signals SR1 to SRn (selection signals) in accordance with an X clock signal XCK, an inverted X clock signal XCKB thereof, an X transfer start pulse DX, etc., from the timing generator 200.

Figure 4:
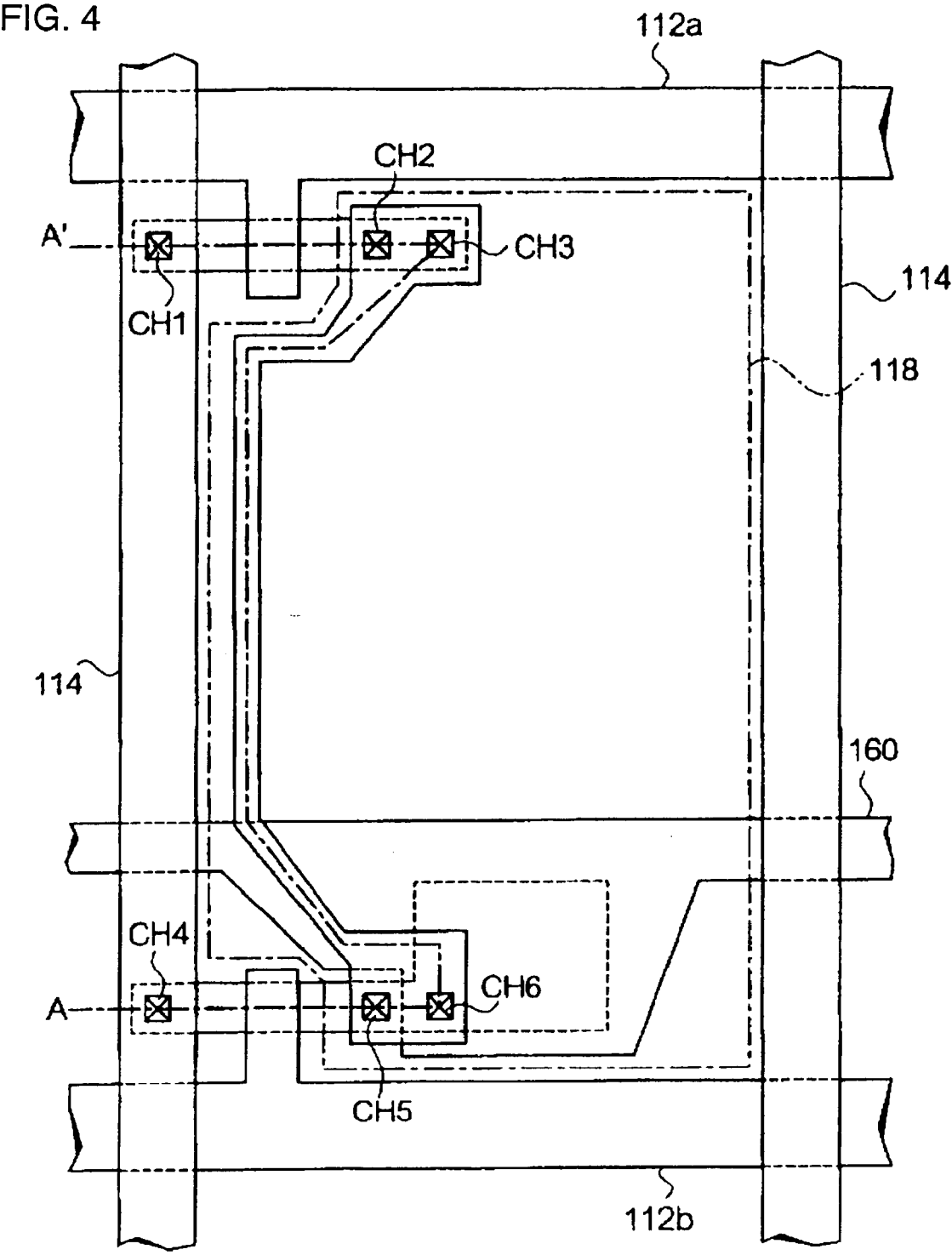
FIG. 4 is a plan view showing an example of the mechanical construction of a pixel in the panel.
Figure 5:
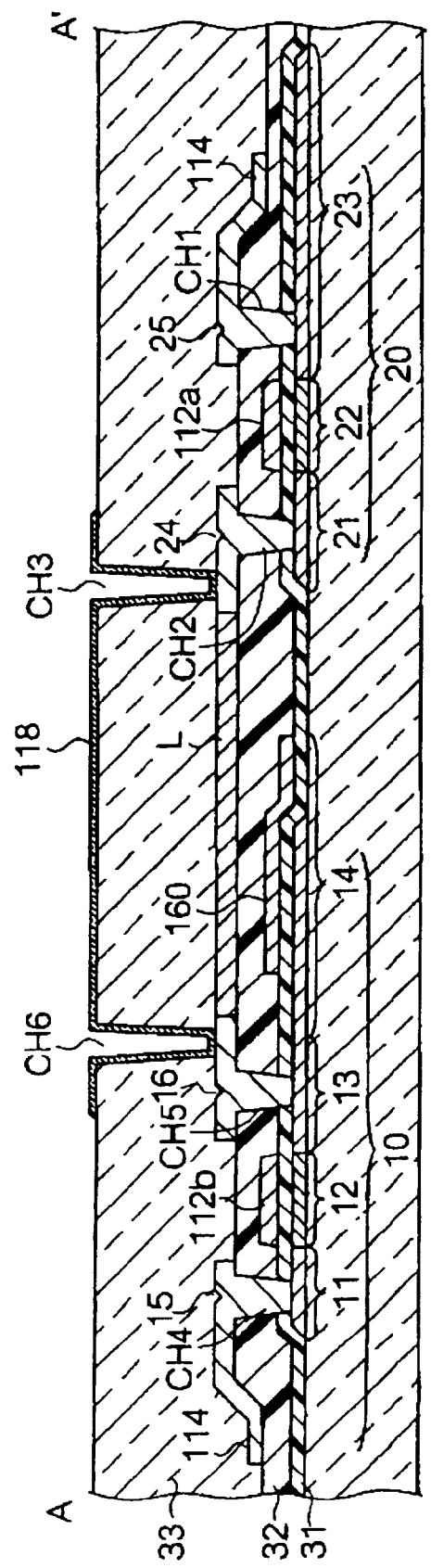
FIG. 5 is a sectional view showing the cross section of A–A' in FIG. 4.

Next, the construction of a pixel will be described. FIG. 4 is a plan view showing the mechanical construction of a pixel. FIG. 5 is a sectional view showing the cross section of A–A' in FIG. 4.

As shown in FIG. 4, the scanning lines 112a and 112b have a protruding shape, and each protruding section is formed as the gate electrode of the P-channel TFT 116p and the N-channel TFT 116n. Also, as shown in FIG. 5, in the P-channel TFT 116p, a source region 23 within a high-concentration impurity area 20 is connected to the data line 114 via a source electrode 25 formed in the contact hole CH1. Meanwhile, a drain electrode 21 of the P-channel TFT 116p is connected to a drain electrode 24 via a contact hole CH2 and is further connected to the pixel electrode 118 via a contact hole CH3 formed in a second interlayer insulating film 33. The high-concentration impurity area 20 of the P-channel TFT 116p is formed by doping dopants of the group III elements, such as Al (aluminum) or B (boron), by ion implantation, etc., from above a polysilicon film.

Similarly to the P-channel TFT 116p, in the N-channel TFT 116n, a source region 11 within a high-concentration impurity area 10 is connected to the data line 114 via a source electrode 15 formed in a contact hole CH4. Meanwhile, a drain region 13 of the N-channel TFT 116n is connected to a drain electrode 16 via a contact hole CH5 and is further connected to the pixel electrode 118 via a contact hole CH6. The high-concentration impurity area 10 is formed by doping dopants of the group V elements, such as Sb (antimony), As (arsenic), or P (phosphorus), by ion implantation, etc., from above a polysilicon film.

Here, for the P-channel TFT 116p and the N-channel TFT 116n, it is preferable that the balance of I–V characteristics of both be adjusted by increasing the channel width in the P-channel TFT 116p or by increasing the channel length in the N-channel TFT 116n.

Also, the P-channel TFT 116p and the N-channel TFT 116n may be of any one of the self-alignment structure, the offset gate structure, and the LDD structure.

Next, a capacitor line 160 can be disposed in proximity to the scanning line 112b. A portion of the region 14 which follows the drain region 13 in the high-concentration impurity area 10 of the N-channel TFT 116n opposes the capacitor line 160 via a gate insulating film 31. This region 14 may be considered as a part of the drain region 13. The holding capacitor HC is formed in this overlapping region. Since a portion of the drain region 14 which follows the drain region 13 is formed as the holding capacitor HC in this manner, the drain region 16 of the N-channel TFT 116n is directly connected to the holding capacitor HC. The capacitance element is formed by two opposing electrodes and a dielectric held between them. In this example, since one of the electrodes and the drain region (a portion of the drain region 14) are shared, it is not necessary to separately provide one of the electrodes, and the construction and the manufacturing process of the liquid-crystal display panel 100 can be simplified.

Next, the wiring line L, in which a high-melting point metal, such as aluminum or silver, is used as a material, connects the drain electrode 24 of the P-channel TFT 116p to the drain electrode 16 of the N-channel TFT 116n. Also, the drain electrodes 24 and 16 are formed in such a way that contact holes CH2 and CH5 are formed in a first interlayer insulating film 32 and an aluminum electrode is wired therein. That is, the wiring line L is formed in the same interlayer at the same time as the source electrodes 15 and 25 and the drain electrodes 16 and 24. There are cases in which the wiring line L has a multilayered structure in which a titanium layer, an aluminum alloy layer, and a titanium nitride layer, etc., are laminated in this order from the lower layer side.

Also, the wiring line L can be arranged in such a way that, when the liquid-crystal display panel 100 is seen from the opposing substrate 102 side, a part or the whole of the wiring line L overlaps with the lattice-shaped black matrix provided therein. The black matrix is used to display an image clearly by surrounding each pixel by a black frame, and that portion does not allow light to pass therethrough. Meanwhile, although the wiring line L does not allow light to pass therethrough either, a decrease in the aperture ratio can be prevented by arranging the wiring line L in such a manner as to overlap with a portion or the whole of the black matrix.

The pixel electrode 118 of this example can be formed of a transparent conductive film, such as ITO (Indium Tin Oxide). For the wiring line L, since a high-melting point metal is used as the material, the resistance per unit area is very small in comparison with ITO. Therefore, the wiring line L allows the value of the equivalent resistance which occurs between the drain electrode 24 of the P-channel TFT 116p and the holding capacitor HC to be very small.

Since the contact holes CH5 and CH2 which connect the drain electrodes 16 and 24 to the drain regions 13 and 21 are connected to the polysilicon layers 10 and 20 firstly, these are generally referred to as first contact holes. Also, the contact holes CH6 and CH3 which connect the drain electrodes 16 and 24 to the pixel electrode 118 are generally referred to as second contact holes. In the first and second contact holes, since different types of materials contact with each other so as to achieve electrical conduction, the resistance becomes larger at the contact surface.

In comparison, the wiring line L is formed integrally by the same process as that of the drain electrodes 16 and 24, and moreover, a low-resistance material is used. Therefore, the equivalent resistance of the wiring line L is smaller than the resistances of the first contact hole and the second contact hole. When the wiring line L is not provided, the equivalent resistance of the second contact hole causes the time constant when an image signal is written into the holding capacitor HC to become larger. However, by providing the wiring line L, the time constant can be decreased.

Figure 6:
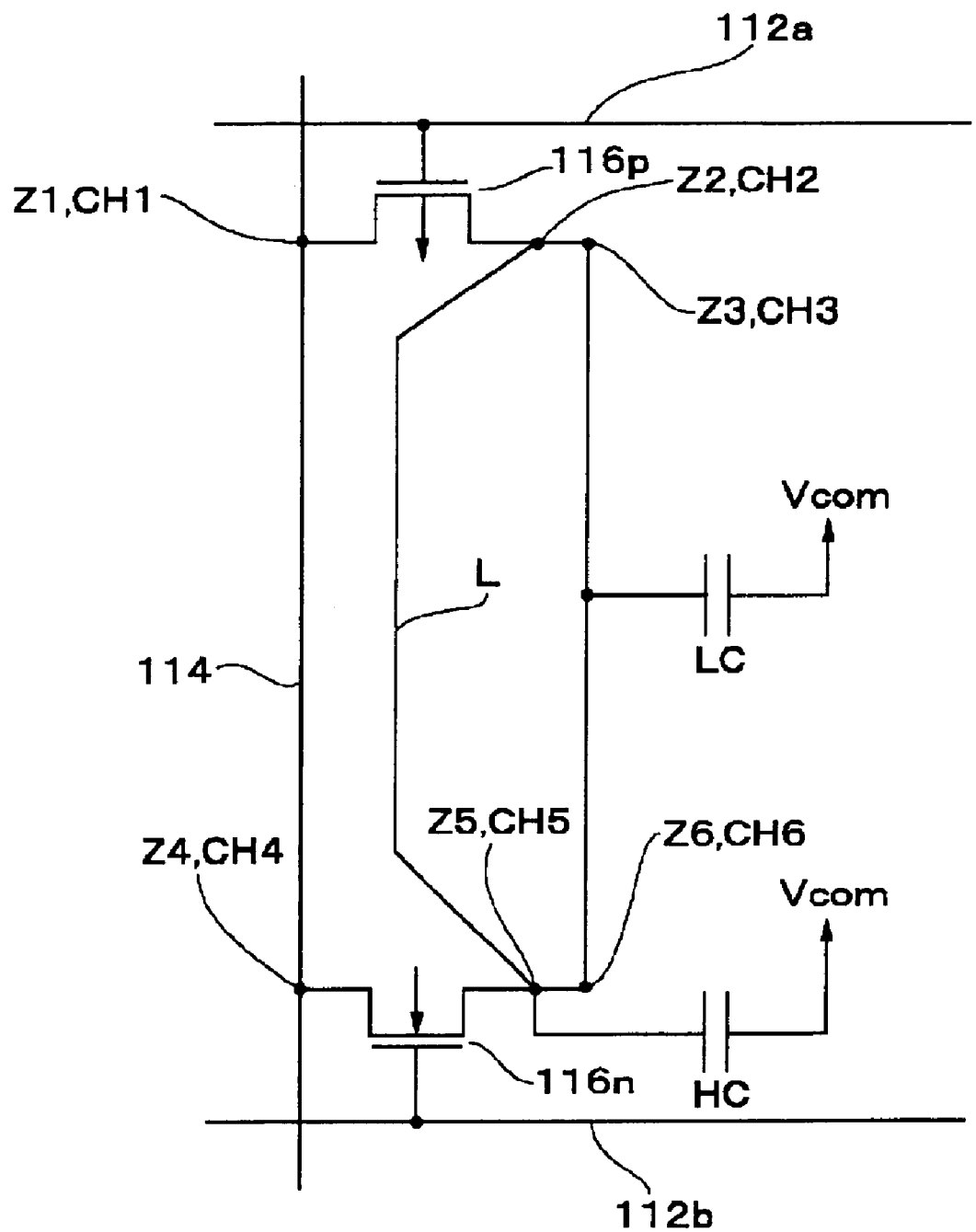
FIG. 6 is an exemplary circuit diagram showing an equivalent circuit of a pixel in a manner corresponding to the pixel construction shown in FIG. 4.

FIG. 6 shows an exemplary circuit diagram having the equivalent circuit of the pixel in a manner corresponding to the pixel construction shown in FIG. 4. In this figure, contact points Z1 to Z6 correspond to the above-described contact holes CH1 to CH6, respectively.

Figure 7:
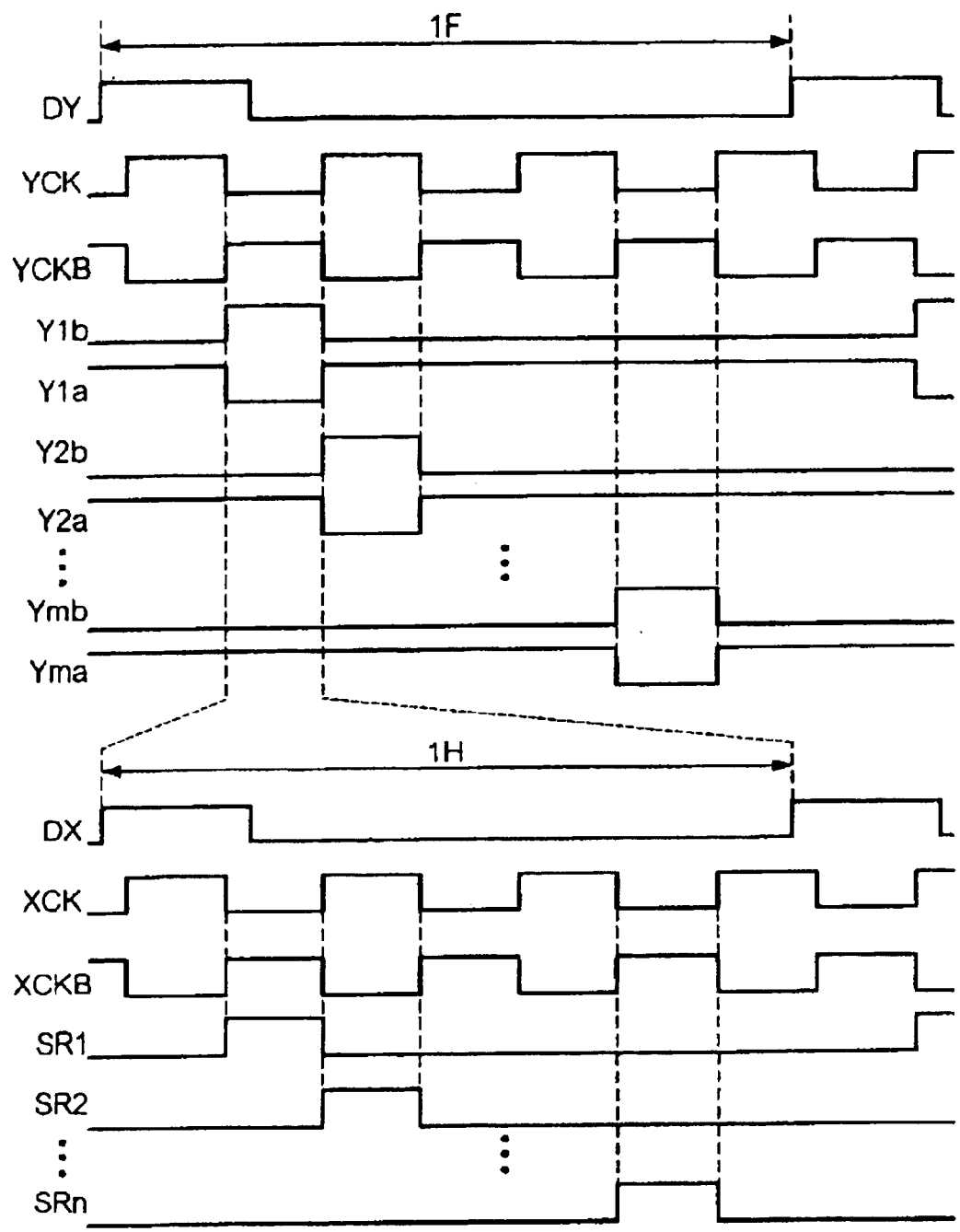
FIG. 7 is a timing chart showing the operation of the liquid-crystal device.

Next, the operation of a liquid-crystal device will be described. FIG. 7 is a timing chart showing the operation of the liquid-crystal device. As shown in this figure, the Y transfer start pulse DY is a pulse in which one field period IF is one cycle. The scanning-line driving circuit 130 sequentially shifts the Y transfer start pulse DY in synchronization with the Y clock signal YCK and the inverted Y clock signal YCKB in order to generate scanning-line signals Y1a, Y1b, Y2a, Y2b, . . . , Yma, Ymb. The scanning-line signals Y1a, Y2a, . . . , Yma are supplied to the respective scanning lines 112a, whereas the scanning-line signals Y1b, Y2b, . . . , Ymb are supplied to the respective scanning lines 112b.

Meanwhile, the X transfer start pulse DX is a pulse in which one horizontal scanning period 1H in which each scanning-line signal becomes active is one cycle. The data-line driving circuit 150 sequentially shifts the X transfer start pulse DX in synchronization with the X clock signal XCK and the inverted X clock signal XCKB in order to generate sampling signals SR1, SR2, . . . , SRn in sequence.

A case is considered in which, for example, an image signal is written into the pixel corresponding to the intersection of the i-th scanning lines 112a and 112b and the data line 114 belonging to the j-th block. In this case, scanning-line signals Yia and Yib become active, and both the P-channel TFT 116p and the N-channel TFT 116n of the concerned pixel are turned on. In this state, when the j-th sampling signal SRj is made to be active, the sampling switch 141 corresponding to the j-th block is turned on, the image signals VID1 to VID6 are supplied to the respective data lines 114, and the image signal is written into the liquid-crystal capacitor LC and the holding capacitor HC of the concerned pixel.

If it is assumed that the wiring line L, shown in FIG. 5, is not provided as described above in the "Description of Related Art", the writing of the image signal into the holding capacitor HC can be as follows. First, when the image signal passes through the N-channel TFT 116n, the path is: the data line 114, the source electrode 15 (contact hole CH4), the source region 11, the channel region 12, the drain region 13, and the holding capacitor. On the other hand, when the image signal passes through the P-channel TFT 116p, the path is: the data line 114, the source electrode 25 (contact hole CH1), the source region 23, the channel region 22, the drain region 21, the drain electrode 24 (contact hole CH2), the contact hole CH3, the pixel electrode 118, the contact hole CH6, the drain electrode 16 (contact hole CH5), the drain region 13, and the holding capacitor HC.

More specifically, the writing path from the P-channel TFT 116p is lengthened by the amount corresponding to the drain electrode 24 (contact hole CH2), the contact hole CH3, the pixel electrode 118, the contact hole CH6, and the drain electrode 16 (contact hole CH5) in comparison with the writing path from the N-channel TFT 116n. The one having the largest resistance within this writing path is the pixel electrode 118.

In comparison, if the wiring line L is provided as in this embodiment, when the image signal passes through the N-channel TFT 116n, the path is the same as the above-described path. However, when the image signal passes through the P-channel TFT 116p, the path is: the data line 114, the source electrode 25 (contact hole CH1), the source region 23, the channel region 22, the drain region 21, the drain electrode 24 (contact hole CH2), the wiring line L, the drain electrode 16, the drain region 13, and the holding capacitor HC.

More specifically, the writing path from the P-channel TFT 116p is lengthened by the amount corresponding to "the drain electrode 24 (contact hole CH2), the wiring line L, and the drain electrode 16 (contact hole CH5)" in comparison with the writing path from the N-channel TFT 116n.

However, for the wiring line L, a low-resistance material, such as aluminum or silver, is used. Since the resistance of the wiring line L is very small in comparison with the resistance of the pixel electrode 118 or the contact resistance in the manner described above, according to this embodiment, the time constant when the image signal is written via the P-channel TFT 116p can be greatly decreased.

The image signal needs to be written into the holding capacitor HC in the period in which the data line is selected. However, since the time constant can be greatly decreased, even if the length of the selection period is short, the image signal can be sufficiently written into the holding capacitor HC. Therefore, a large contrast ratio can be obtained, and a vivid image display becomes possible. Also, even if the number of data lines and the number of scanning lines are increased and the length of the selection period becomes shorter, the contrast ratio is not decreased, and a high-resolution image can be displayed with high quality.

Furthermore, the difference in the time constants between when the image signal is written via the N-channel TFT 116n and when the image signal is written via the P-channel TFT 116p can be decreased. Therefore, display variations which occur due to the difference in time constants can be greatly reduced.

In addition, since the writing into the holding capacitor HC becomes easier, the signal amplitude of the image signal supplied to the data line 114 can be decreased. Also, as a consequence of this, the amplitude of the scanning-line signals Y1a, Y1b, Y2a, Y2b, . . . , Yma, Ymb can be decreased, and the amplitude of the sampling signals SR1, SR2, . . . , SRn can be decreased. As a result, the power-supply voltage of the amplification/inversion circuit 304, the scanning-line driving circuit 130, and the data-line driving circuit 150 can be decreased, allowing the power consumption to be reduced.

Next, modifications of this embodiment will be described.

Figure 8:
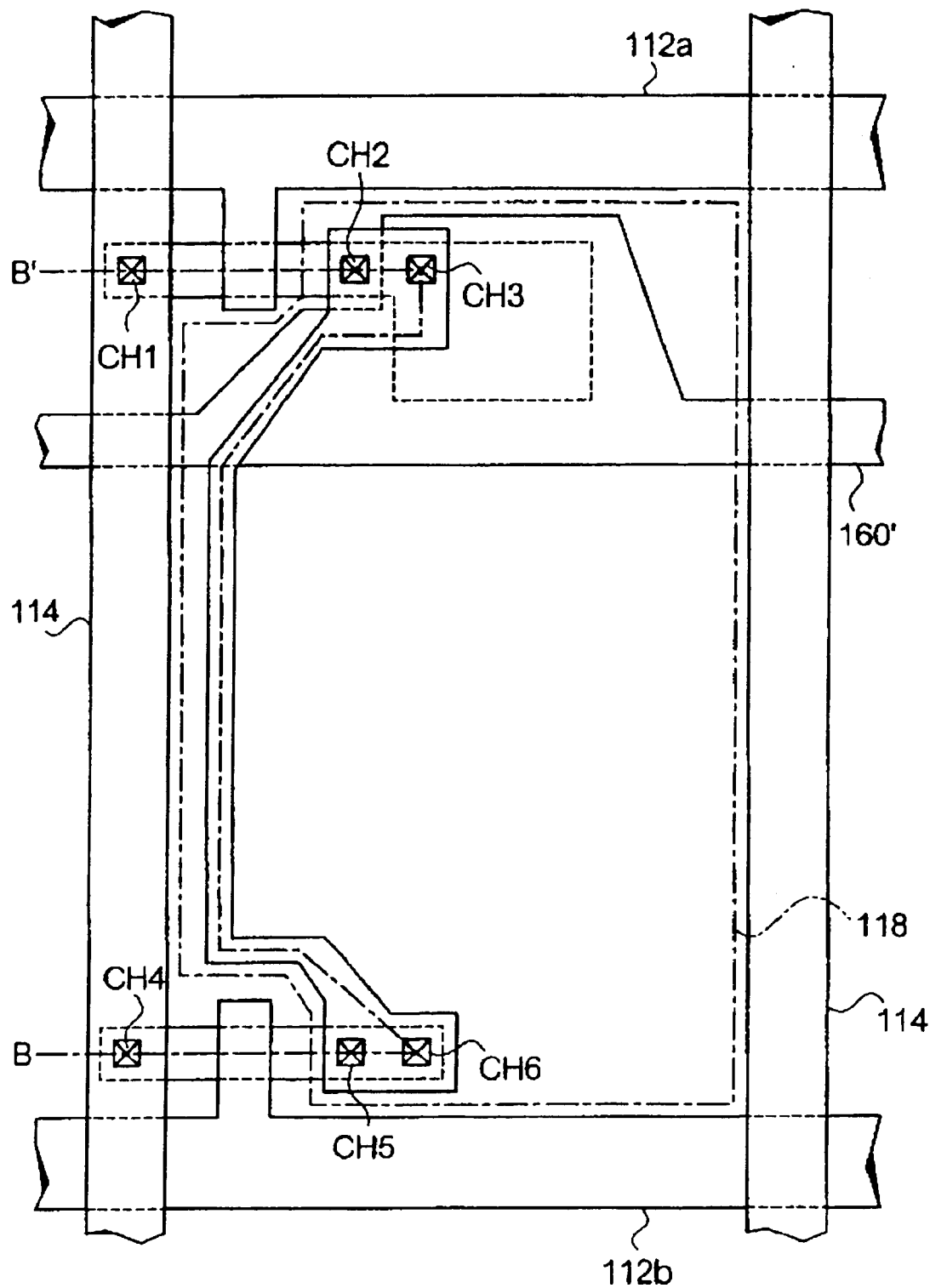
FIG. 8 is a plan view showing another example of the mechanical construction of a pixel according to an application example.
Figure 9:
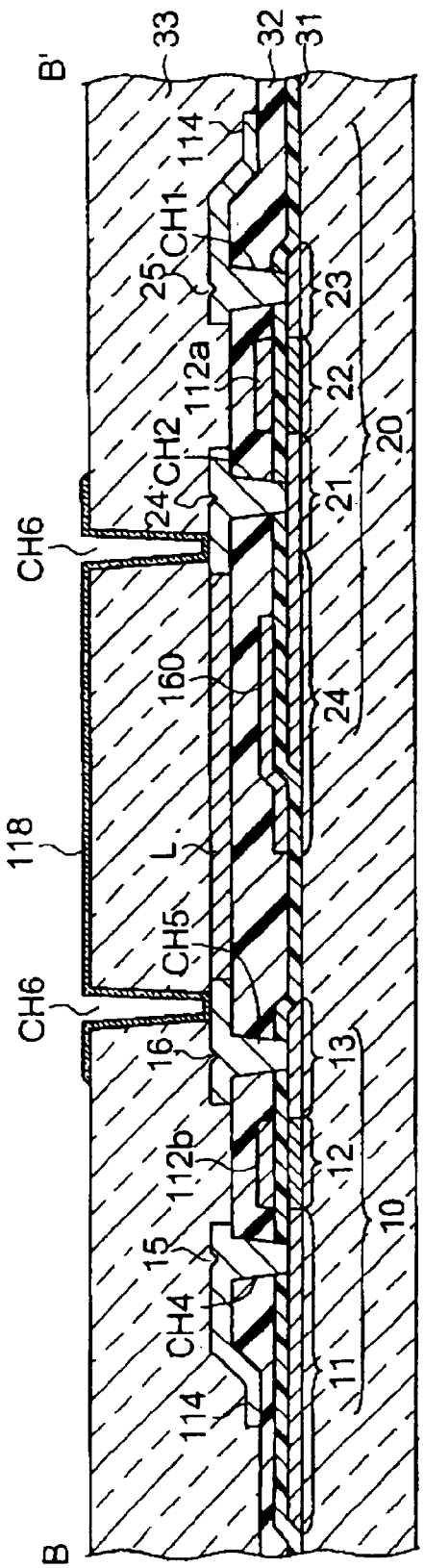
FIG. 9 is a sectional view showing the cross section of B–B' in FIG. 8.

In the above-described embodiment, a capacitor line is provided adjacent to the N-channel TFT 116n, and the holding capacitor HC is formed between the region adjacent to the drain region of the N-channel TFT 116n and the capacitor line. However, it is to be understood that the present invention is not limited to this, and a capacitor line may be provided adjacent to the P-channel TFT 116p, so that the holding capacitor HC is formed therein. FIG. 8 is a plan view showing another example of the mechanical construction of the pixel. FIG. 9 is a sectional view showing the cross section of B–B' in FIG. 8.

As shown in FIG. 8, the capacitor line 160 is arranged in proximity to the scanning line 112a. Then, as shown in FIG. 9, a part of the region 24 which follows the drain electrode 21 in the high-concentration impurity area 20 of the P-channel TFT 116p opposes the capacitor line 160 via the gate insulating film 31. A dopant of the group III elements, such as B (boron), is doped in the region 24 by ion implantation. The holding capacitor HC is formed in this overlapping region. The drain electrode 24 of the P-channel TFT 116p is connected to the holding capacitor HC.

Next, the wiring line L, in which a high-melting point metal, such as aluminum or silver, is used as a material in a manner similar to the above-described embodiment, connects the drain electrode 24 of the P-channel TFT 116p to the drain electrode 16 of the N-channel TFT 116n. That is, the source electrodes 15 and 25, the drain electrodes 16 and 24, and the wiring line L are formed at the same time in the same interlayer. Therefore, the drain electrode 16 of the N-channel TFT 116n can be connected to the holding capacitor HC with a low resistance.

According to this example, the writing of an image signal into the holding capacitor HC can be as follows. First, when the image signal passes through the P-channel TFT 116p, the path is: the data line 114, the source electrode 25 (contact hole CH1), the source region 23, the channel region 22, the drain electrode 21, and the holding capacitor HC. On the other hand, when the image signal passes through the N-channel TFT 116n, the path is: the data line 114, the source electrode 15 (contact hole CH1), the source region 23, the channel region 22, the drain electrode 21, the drain electrode 24 (contact hole CH2), the contact hole CH3, the pixel electrode 118, the contact hole CH6, the drain electrode 16 (contact hole CH5), the drain region 13, and the holding capacitor HC.

In other words, in the writing path from the P-channel TFT 116p, the image signal is directly written into the holding capacitor HC, whereas, in the writing path from the N-channel TFT 116n, the image signal is directly written into the holding capacitor HC via the wiring line L.

However, since a low resistance material is used for the wiring line L, the resistance thereof is very small in comparison with the resistance of the pixel electrode 118. Therefore, similarly to the case where the image signal is written via the P-channel TFT 116p in the above-described embodiment, the time constant when the image signal is written via the N-channel TFT 116n can be greatly decreased. As a result, also in the application example, a large contrast ratio can be obtained, and a vivid image display becomes possible. Also, even if the number of data lines and the number of scanning lines are increased and the length of the selection period becomes shorter, the contrast ratio is not decreased, and a high-resolution image can be displayed with high quality.

Although in the above-described embodiment, a transmitting-type liquid-crystal device is described, it is to be understood that the present invention is not limited thereto, and can be applied to a reflection-type liquid-crystal device and a semi-transmitting-reflecting-type liquid-crystal device.

Figure 10:
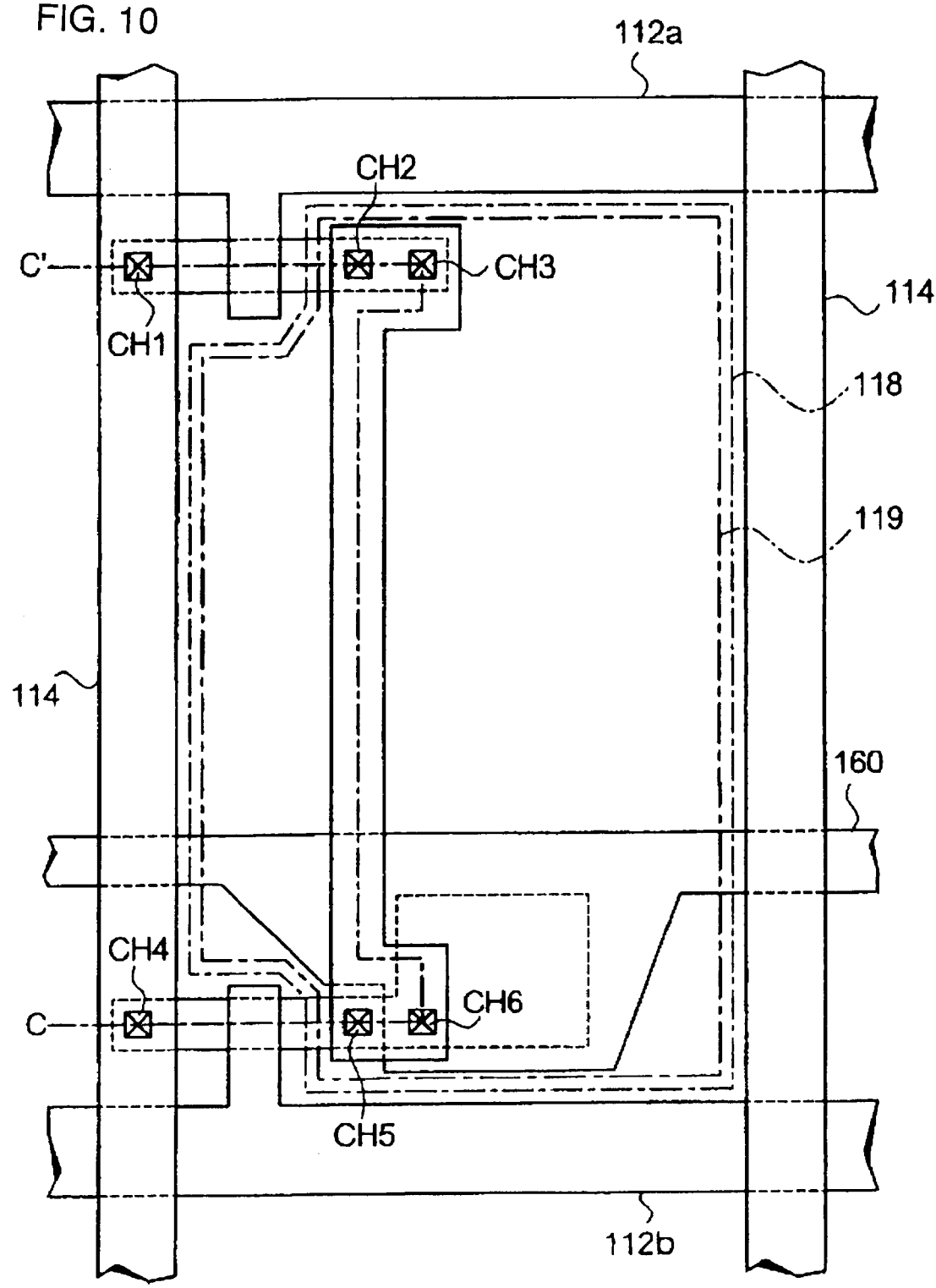
FIG. 10 is a plan view showing an example of the mechanical construction of a pixel in a reflection-type liquid-crystal device.
Figure 11:
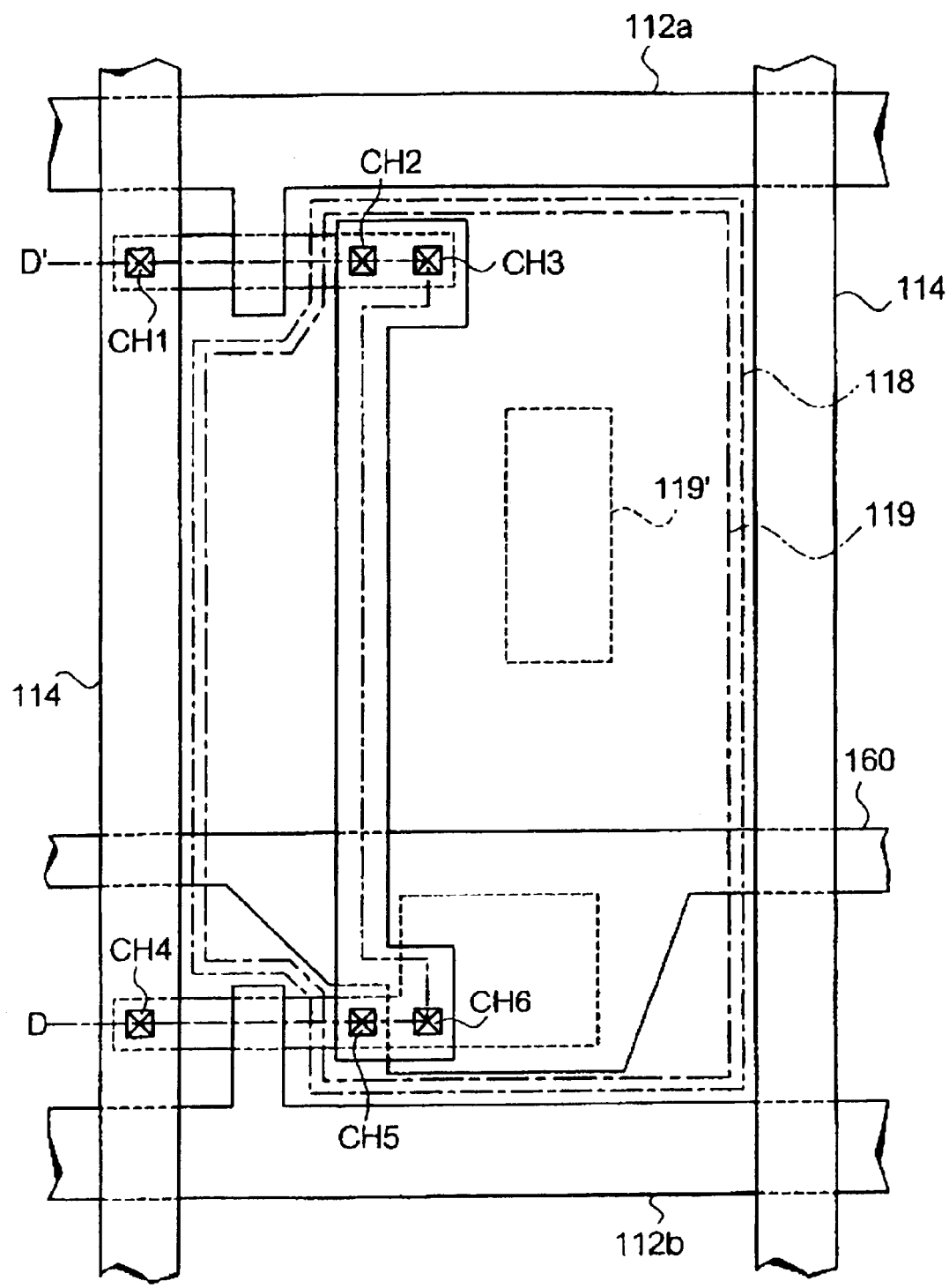
FIG. 11 is a plan view showing an example of the mechanical construction of a pixel in a semi-transmitting-reflecting-type liquid-crystal device.
Figure 12:
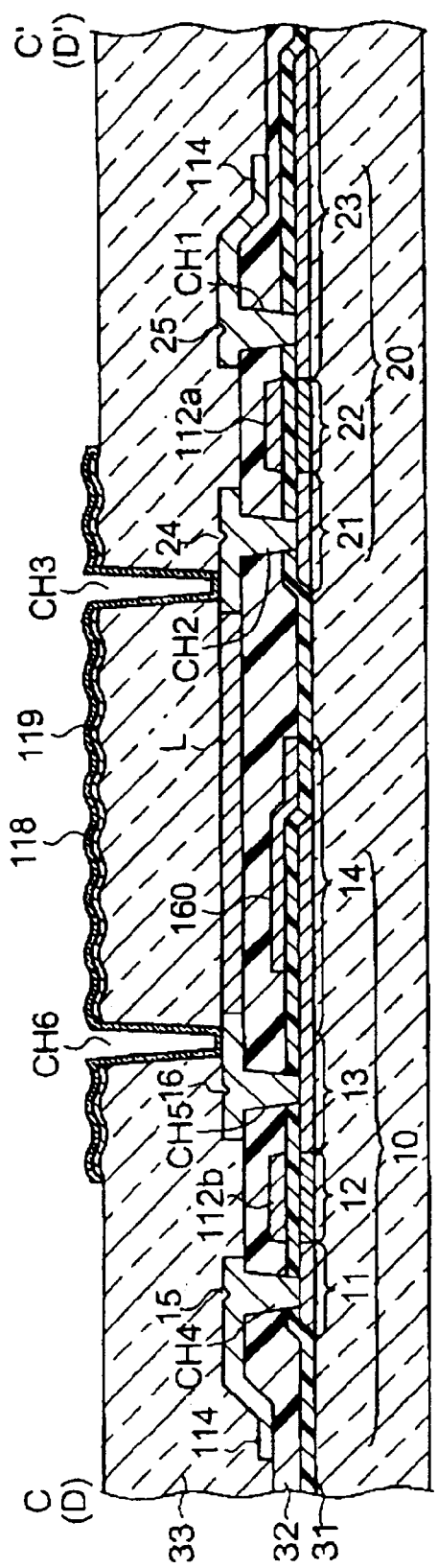
FIG. 12 is a sectional view showing the cross section of C–C' of FIG. 10 and the cross section of D–D' of FIG. 11.

FIG. 10 is a plan view showing an example of the mechanical construction of a pixel in a reflection-type liquid-crystal device. FIG. 11 is a plan view showing an example of the mechanical construction of a pixel in a semi-transmitting-reflecting-type liquid-crystal device. FIG. 12 is a sectional view showing the cross section of C–C' of FIG. 10 and the cross section of D–D' of FIG. 11.

First, in the reflection-type liquid-crystal device, a reflection layer 119, in which aluminum, silver, etc., is used as the material, is formed on the second interlayer insulating film 33, and a pixel electrode 118 made of an ITO film (transparent conductive film) is formed so as to cover the reflection layer 119. The illustration of the reflection layer 119 and the pixel electrode 118 is omitted in the plan view of FIG. 11, etc., and these are not planar as in the above-described embodiment, rather they are made to have unevenness. As a result, incident light can be subjected to diffuse reflection, and uniform display light can be obtained. Such unevenness can be formed in such a way that, at the lower-layer side, after a predetermined uneven pattern is formed in a photosensitive resin layer, the surface thereof is covered with an upper-layer-side photosensitive resin layer.

In order to increase the aperture ratio, it is necessary to increase the area of the reflection layer 119 as much as possible. Therefore, in this example, wiring line L is formed under the reflection layer 119. The underside of the reflection layer 119 becomes a dead space where incident light does not reach. By providing the wiring line L in such a space, the time constant when an image signal is written into the holding capacitor can be decreased without reducing the aperture ratio.

Next, in the semi-transmitting-reflecting-type liquid-crystal device, an opening 119' is formed in a portion of the reflection layer 119, as shown in FIG. 11. The opening 119' is provided to cause the light of the backlight to pass therethrough. Since the wiring line L does not allow light to pass therethrough, if the wiring line L is formed in such a manner as to move across the opening 119', the usage efficiency of the display light is decreased. Therefore, in this example, the wiring line L is arranged so as to avoid the opening 119'. As a result, the time constant when an image signal is written into the holding capacitor can be decreased without reducing the aperture ratio.

Figure 13:
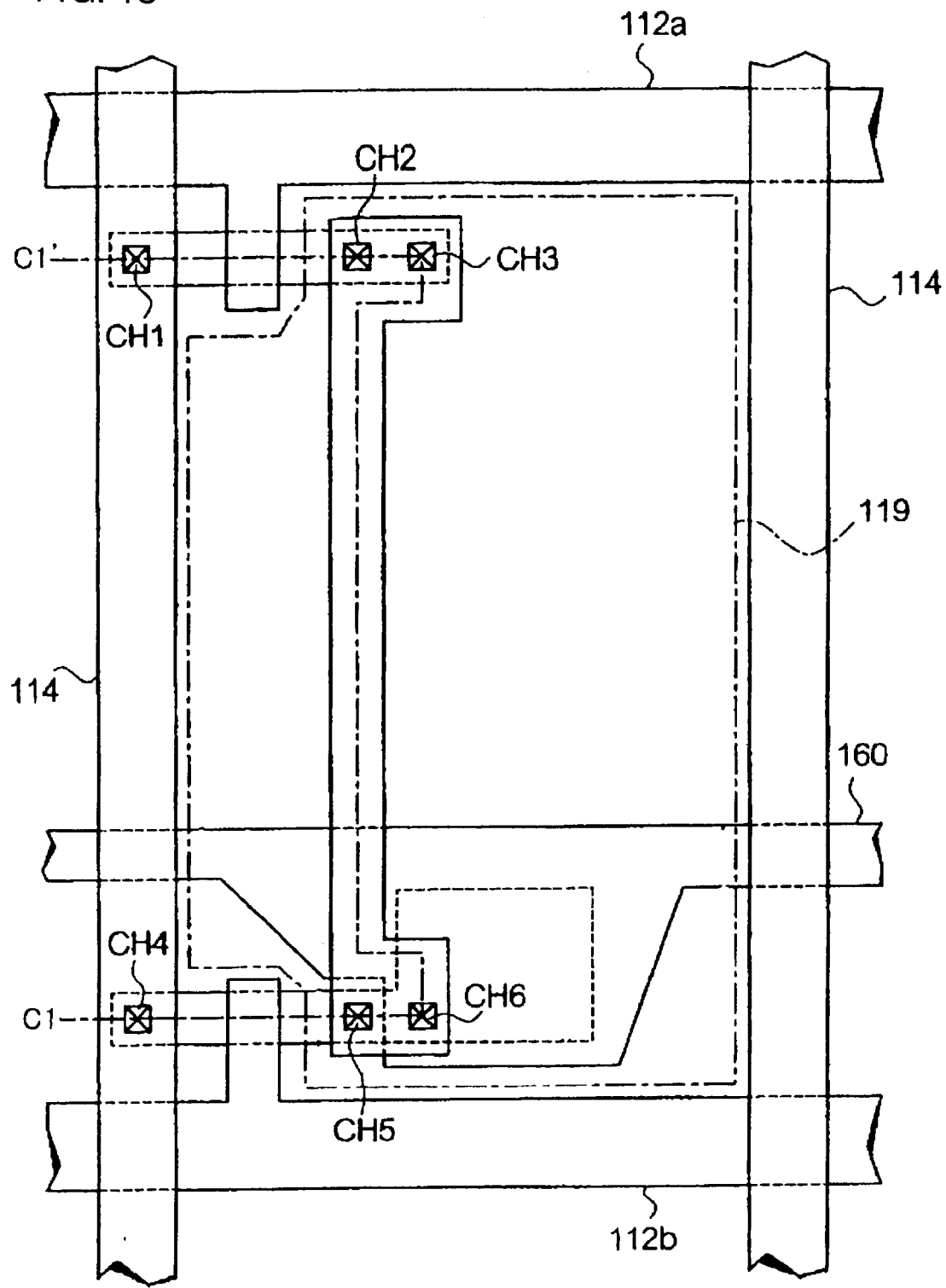
FIG. 13 is a plan view showing an example of the mechanical construction of a pixel in a case where a reflecting plate and a pixel electrode are shared in a reflection-type liquid-crystal device.
Figure 14:
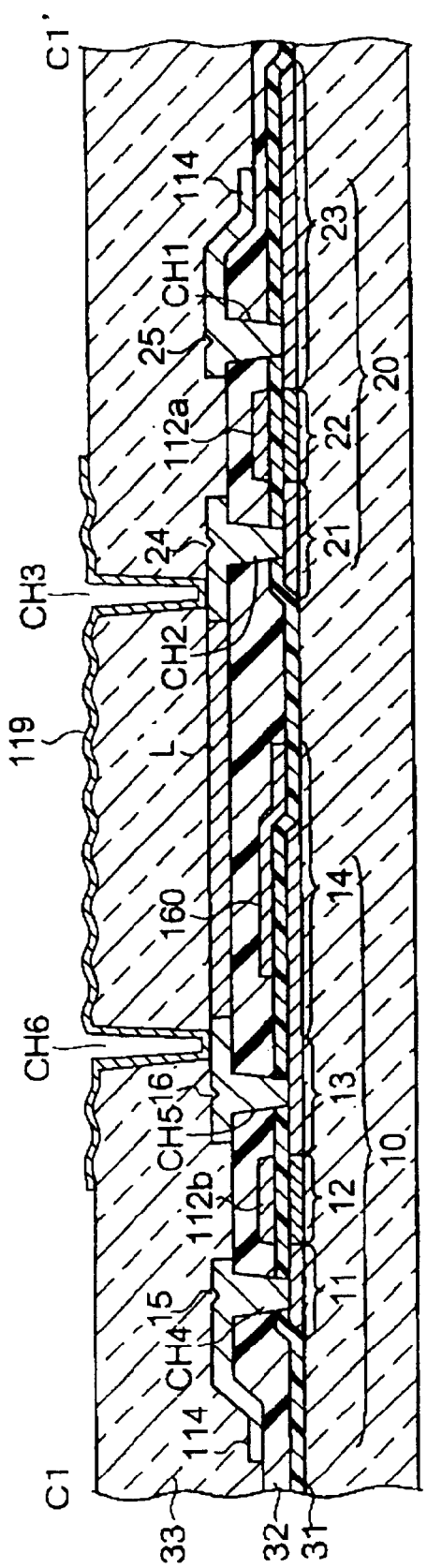
FIG. 14 is a sectional view showing the cross section of C1–C1' of FIG. 13.

FIG. 13 is a plan view showing an example of the mechanical construction of a pixel in a case where a reflecting plate and a pixel electrode are shared in a reflection-type liquid-crystal device. FIG. 14 is a sectional view showing the cross section of C1–C1' of FIG. 13.

In a total-reflection-type liquid-crystal device, as shown in FIGS. 13 and 14, a reflection layer 119 itself formed on the second interlayer insulating film 33 by using a light-reflecting conductive film such as aluminum or silver may be used as a reflecting pixel electrode. Also, if the reflection layer 119 is formed to be uneven, it becomes possible to cause incident light to undergo diffuse reflection in order to obtain uniform display light. Also, in the case of such a construction, by providing the wiring line L under the reflection layer 119, the time constant when the image signal is written into the holding capacitor can be decreased without reducing the aperture ratio.

In the total-reflection-type or semi-transmitting-reflecting-type liquid-crystal device, in those devices shown in FIGS. 10 to 14, a gap is present between the pixel electrode 118 or the reflection layer 119 and the data line. In addition, the arrangement may be such that the end portion of the pixel electrode overlaps in plan view with the data line.

Figure 15:
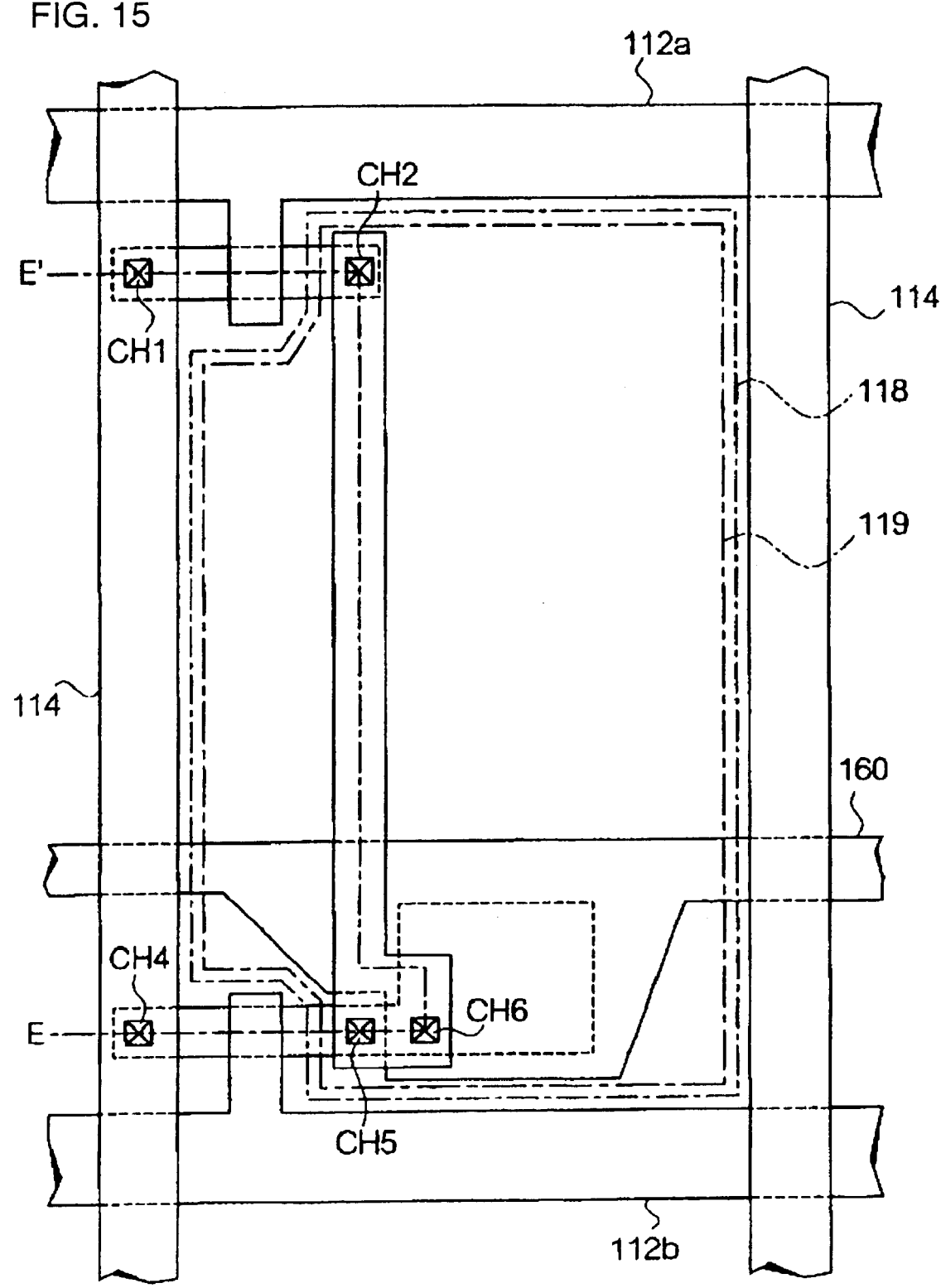
FIG. 15 is a plan view showing an example of the mechanical construction of a pixel in a case where one contact hole is omitted in a reflection-type liquid-crystal device.
Figure 16:
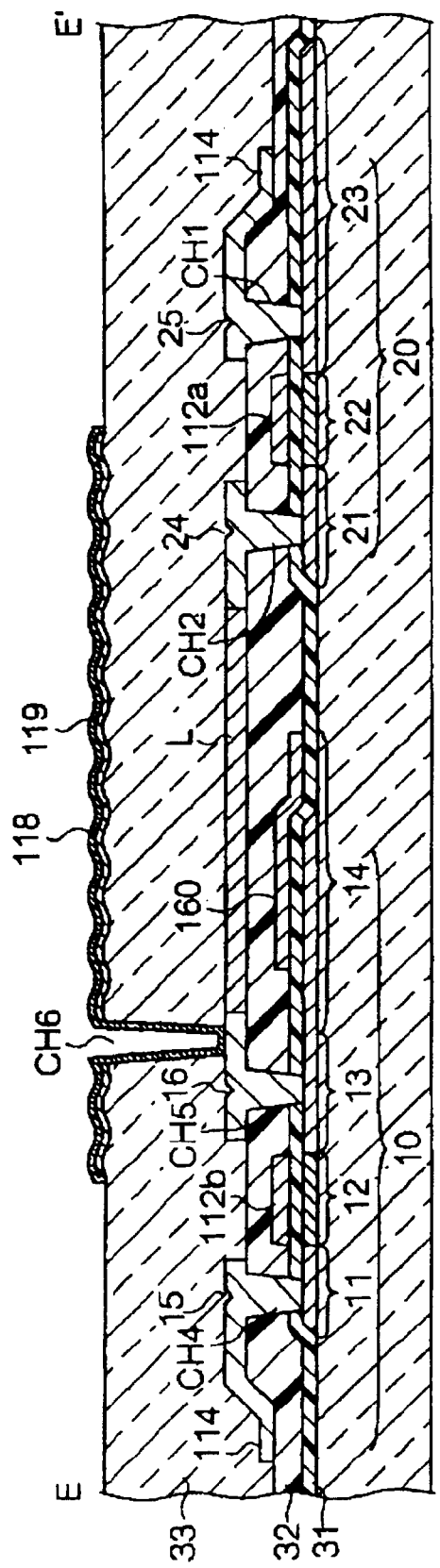
FIG. 16 is a sectional view showing the cross section of E–E' of FIG. 15.
Figure 17:
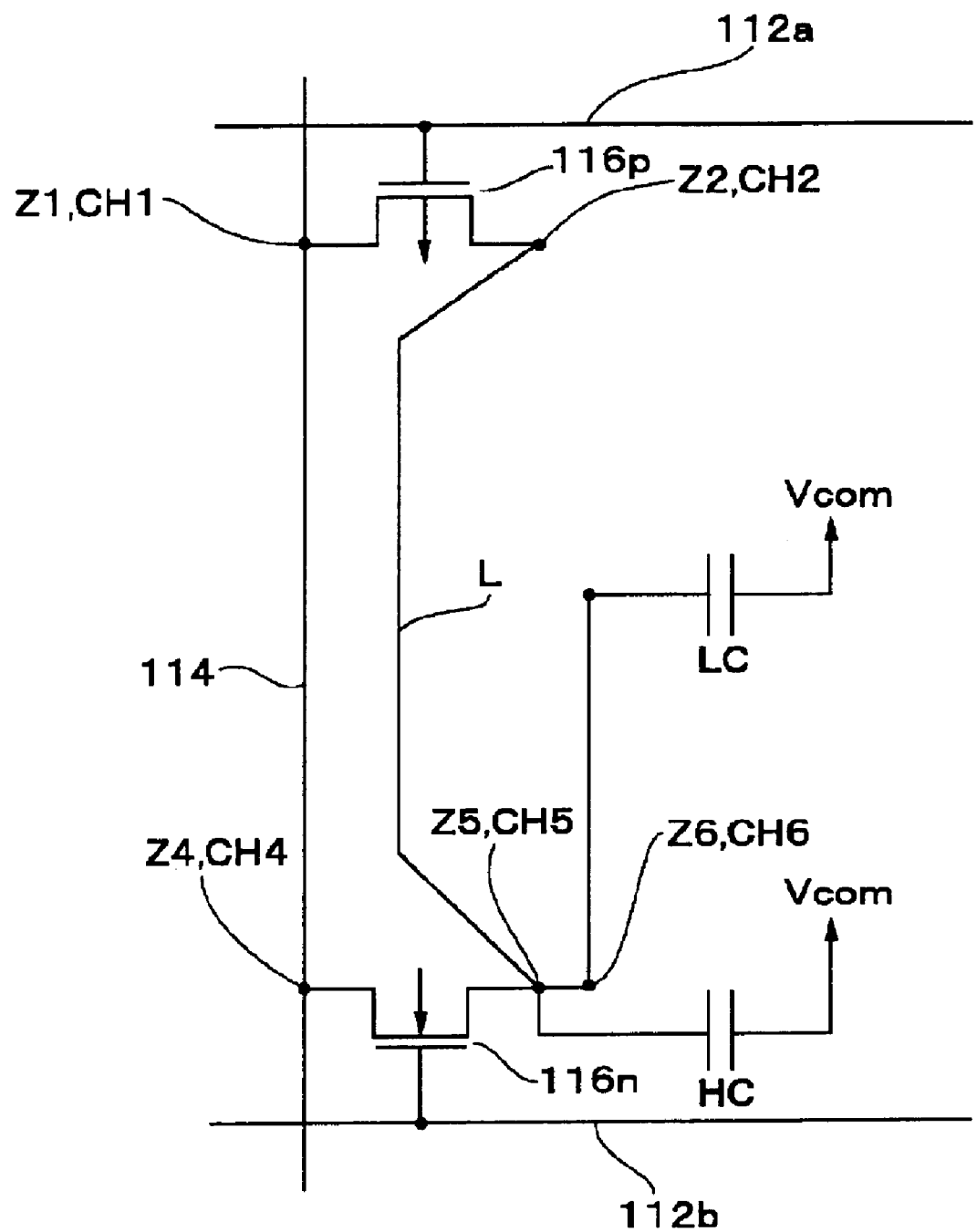
FIG. 17 is an exemplary circuit diagram showing an equivalent circuit of a pixel in a manner corresponding to the pixel construction shown in FIG. 15.

In the above-described transmission-type, reflection-type, or semi-transmitting-reflecting-type liquid-crystal device, either one of the contact holes CH3 and CH6 may be omitted. FIG. 15 is a plan view showing an example of the mechanical construction of a pixel in a case where the contact hole CH3 is omitted in the reflection-type liquid-crystal device. FIG. 16 is a sectional view showing the cross section of E–E' of FIG. 15. FIG. 17 is a circuit diagram showing an equivalent circuit of a pixel in a manner corresponding to the pixel construction shown in FIG. 15.

The contact holes CH3 and CH6 are provided to connect the drain electrode 16 of the N-channel TFT 116*n* and the drain electrode 24 of the P-channel TFT 116*p* to the pixel electrode 118. If either one of the drain electrodes 16 and 24 is connected to the pixel electrode 118, it is possible to write the image signal into the liquid-crystal capacitor LC.

Since the shapes of the contact holes CH3 and CH6 are different from that of the pixel electrode 118, in the region where these are formed, the state of the electric field applied to the liquid crystal differs from that of the region of the pixel electrode 118. For this reason, since the region where the contact holes CH3 and CH6 are formed must be covered with a black matrix, the aperture ratio is decreased.

In this example, since the contact hole CH3 is omitted, the aperture ratio can be improved. In this case, when the contact hole CH3 is omitted, the drain electrode 16 of the N-channel TFT 116*n* is not connected to the drain electrode 24 of the P-channel TFT 116*p* via the pixel electrode 118. However, since the drain electrodes 16 and 24 are connected to each other by the wiring line L formed of a low resistance material, even if the contact hole CH3 is omitted, the time constant when the image signal is written into the holding capacitor HC is hardly increased.

Figure 18:
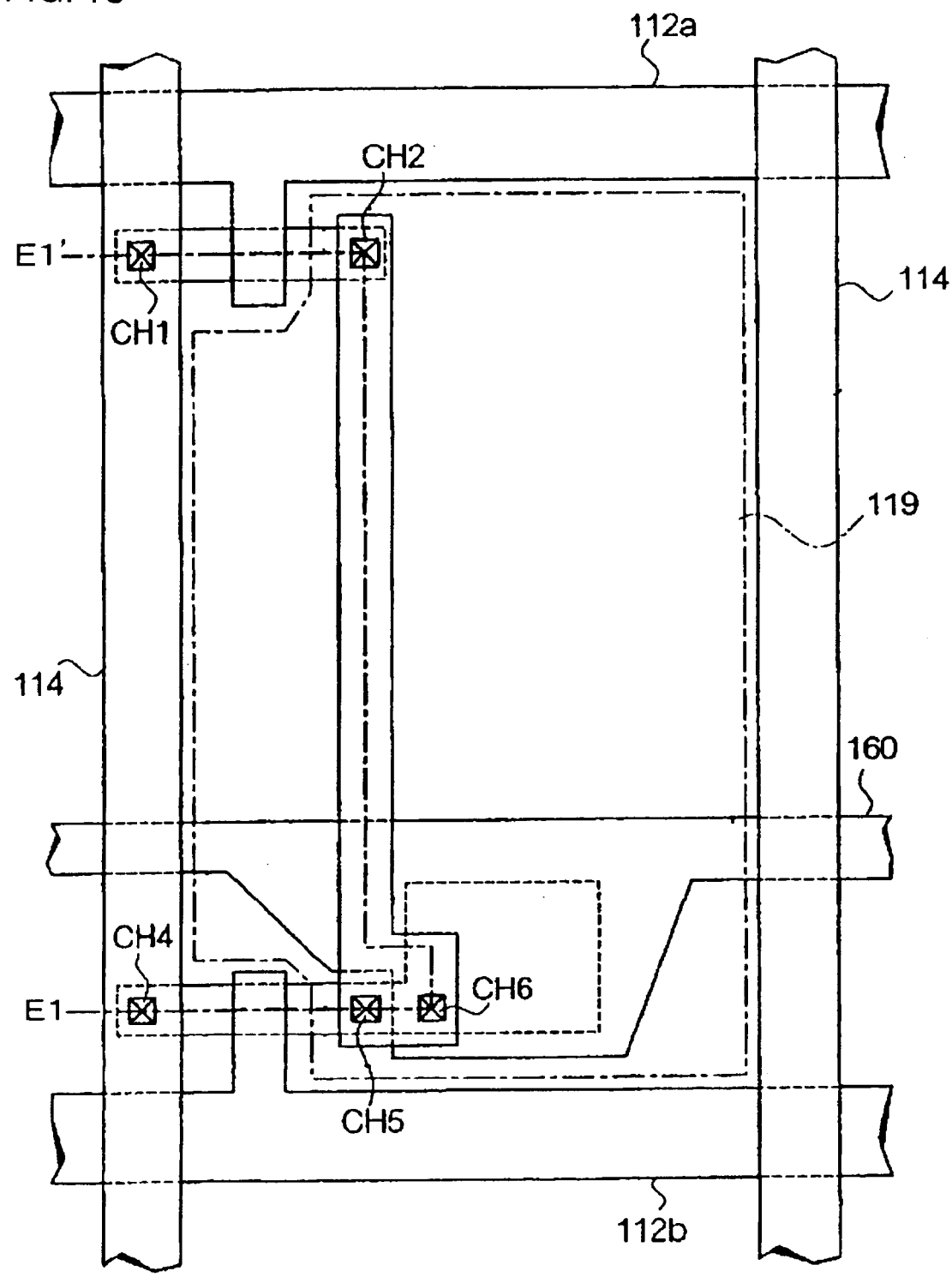
FIG. 18 is a plan view showing an example of the mechanical construction of a pixel in a case where a reflecting plate and a pixel electrode are shared and one contact hole is omitted in the reflection-type liquid-crystal device.
Figure 19:
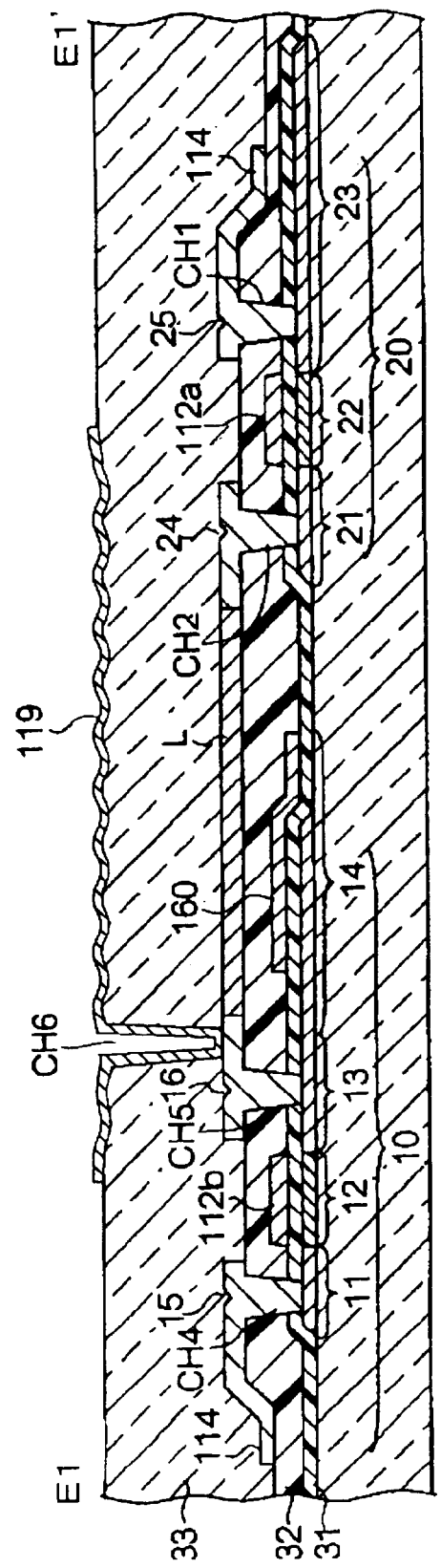
FIG. 19 is a sectional view showing the cross section of E1–E1' of FIG. 18.

FIG. 18 is a plan view showing an example of the mechanical construction of a pixel in a case where a reflection plate and a pixel electrode are shared and the contact hole CH3 is omitted in a reflection-type liquid-crystal device. FIG. 19 is a sectional view showing the cross section of E1–E1' of FIG. 18.

In a total-reflection-type liquid-crystal device, as shown in FIGS. 18 and 19, the reflection layer 119 itself formed on the second interlayer insulating film 33 by using a light-reflecting-type conductive film such as aluminum or silver may be used as a reflecting-type pixel electrode. Also, if the reflection layer 119 is formed to be uneven, it becomes possible to cause incident light to undergo diffuse reflection in order to obtain uniform display light. Also, in the case of such a construction, by providing the wiring line L in the underside of the reflection layer 119, the time constant when the image signal written into the holding capacitor can be decreased without reducing the aperture ratio.

Also when the construction is formed in this manner, if the contact hole CH3 is omitted, it is possible to improve the aperture ratio. In this case, the drain electrode 16 of the N-channel TFT 116*n* is not connected to the drain electrode 24 of the P-channel TFT 116*p* via the pixel electrode 118. However, since the drain electrodes 16 and 24 are connected to each other by the wiring line L formed of a low-resistance material, even if the contact hole CH3 is omitted, the time constant when the image signal is written into the holding capacitor HC is hardly increased.

Figure 20:
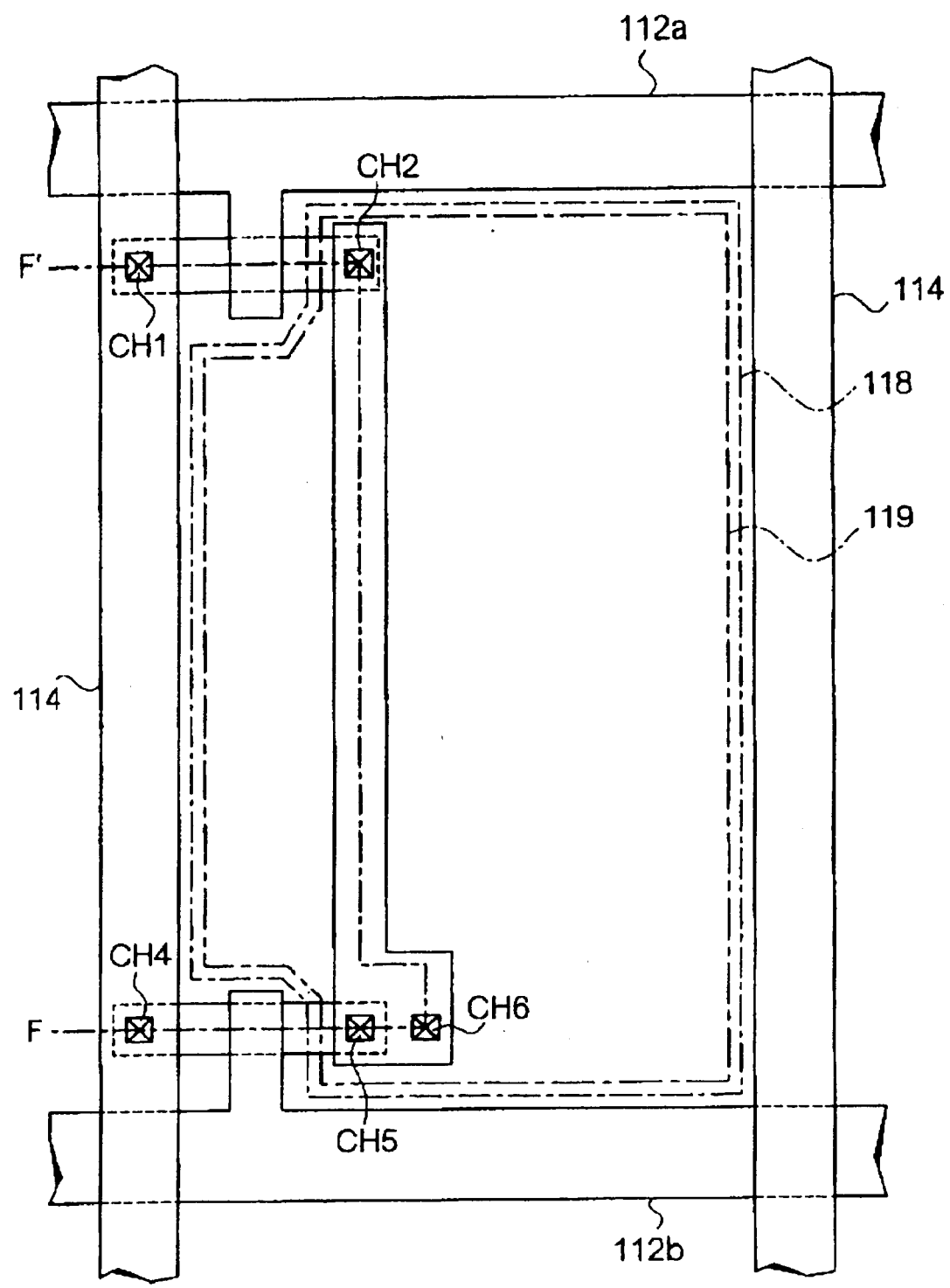
FIG. 20 is a plan view showing an example of the mechanical construction of a pixel in a case where a contact hole and a holding capacitor are omitted in a reflection-type liquid-crystal device.
Figure 21:
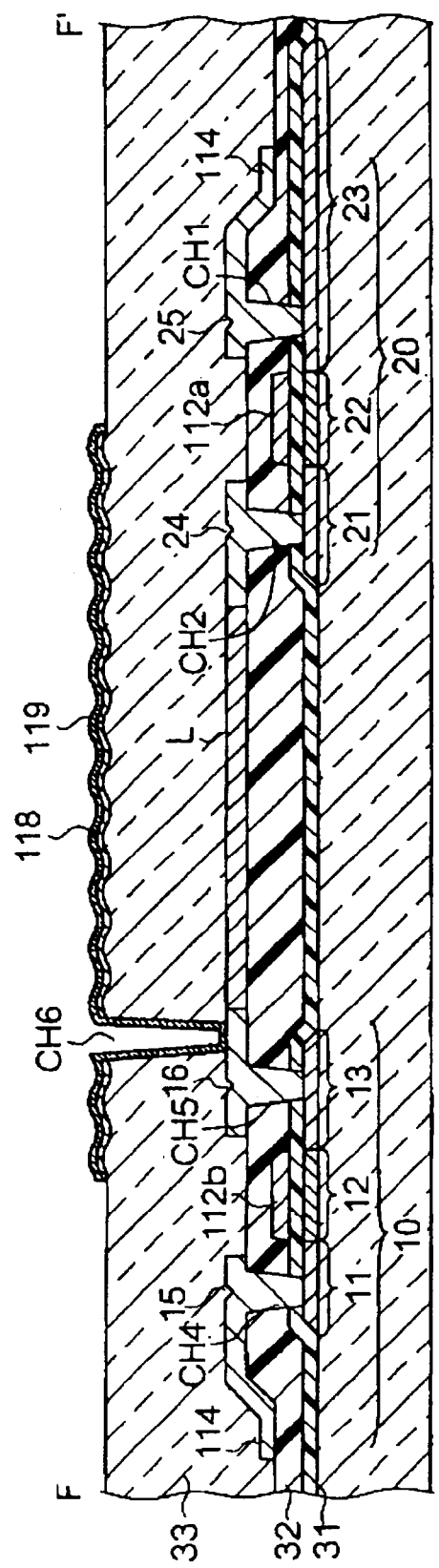
FIG. 21 is a sectional view showing the cross section of F–F' of FIG. 20.
Figure 22:
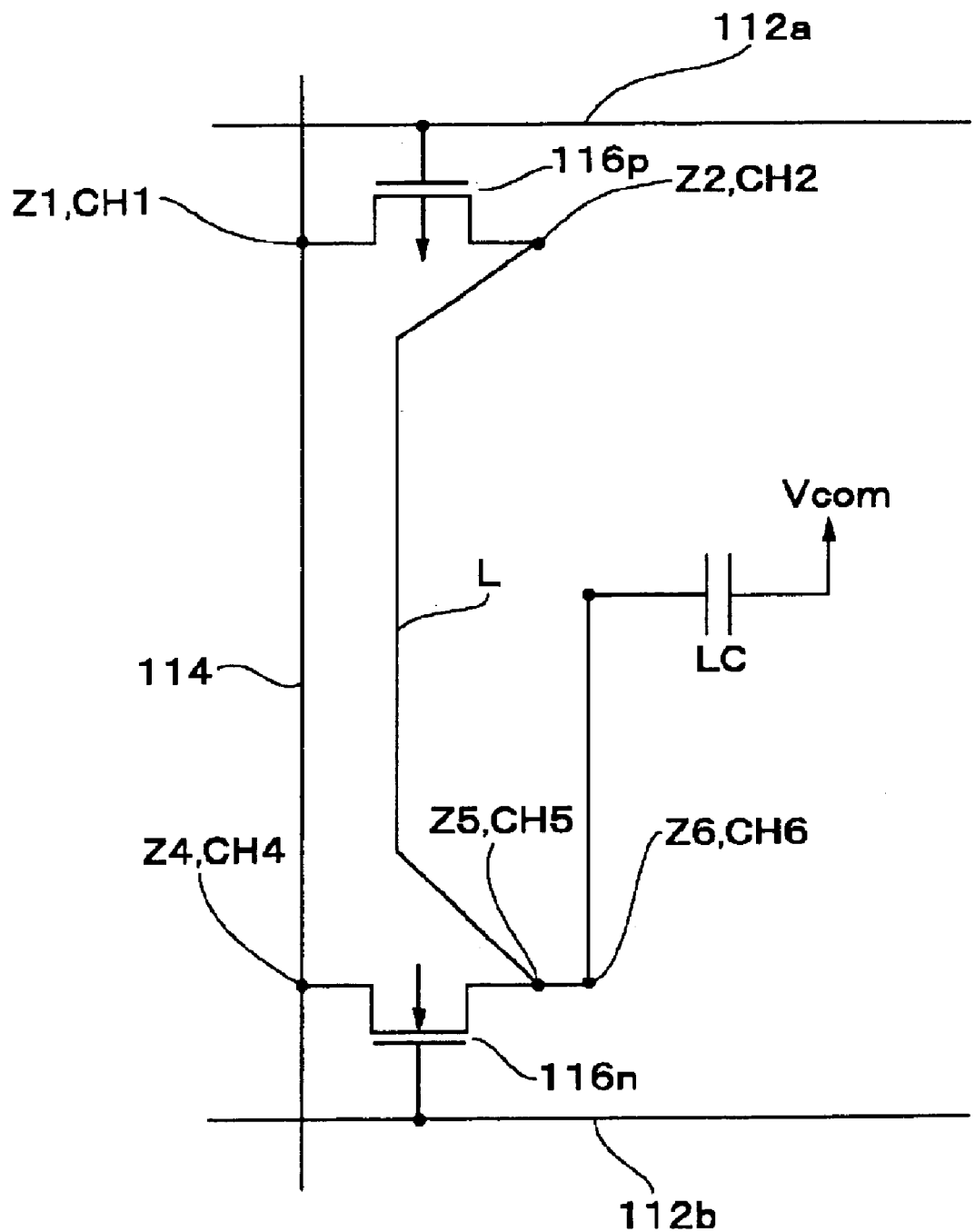
FIG. 22 is an exemplary circuit diagram showing an equivalent circuit in a manner corresponding to the pixel construction shown in FIG. 20.

Furthermore, when either one of the contact holes CH3 and CH6 is omitted, the holding capacitor may be omitted. FIG. 20 is a plan view showing an example of the mechanical construction of a pixel in a case where the contact hole CH3 and the holding capacitor HC are omitted in a reflection-type liquid-crystal device. FIG. 21 is a sectional view showing the cross section of F–F' of FIG. 20. FIG. 22 is a circuit diagram showing an equivalent circuit of a pixel in a manner corresponding to the pixel construction shown in FIG. 20.

In this example, since the holding capacitor HC is not provided, there is no advantage from the viewpoint of writing the image signal into the holding capacitor HC. However, since the drain electrodes 16 and 24 are connected to each other using the wiring line L, either one of the contact holes CH3 and CH6 can be omitted.

For the region where the contact holes CH3 and CH6 are formed as described above, since the state of the electric field applied to the liquid crystal differs from that of the pixel electrode 118, that region must be covered with a black matrix. In this example, since the contact hole CH3 is omitted, it is possible to improve the aperture ratio.

Next, a description is given of a case in which the above-described liquid-crystal device is applied to various types of electronic devices.

Figure 23:
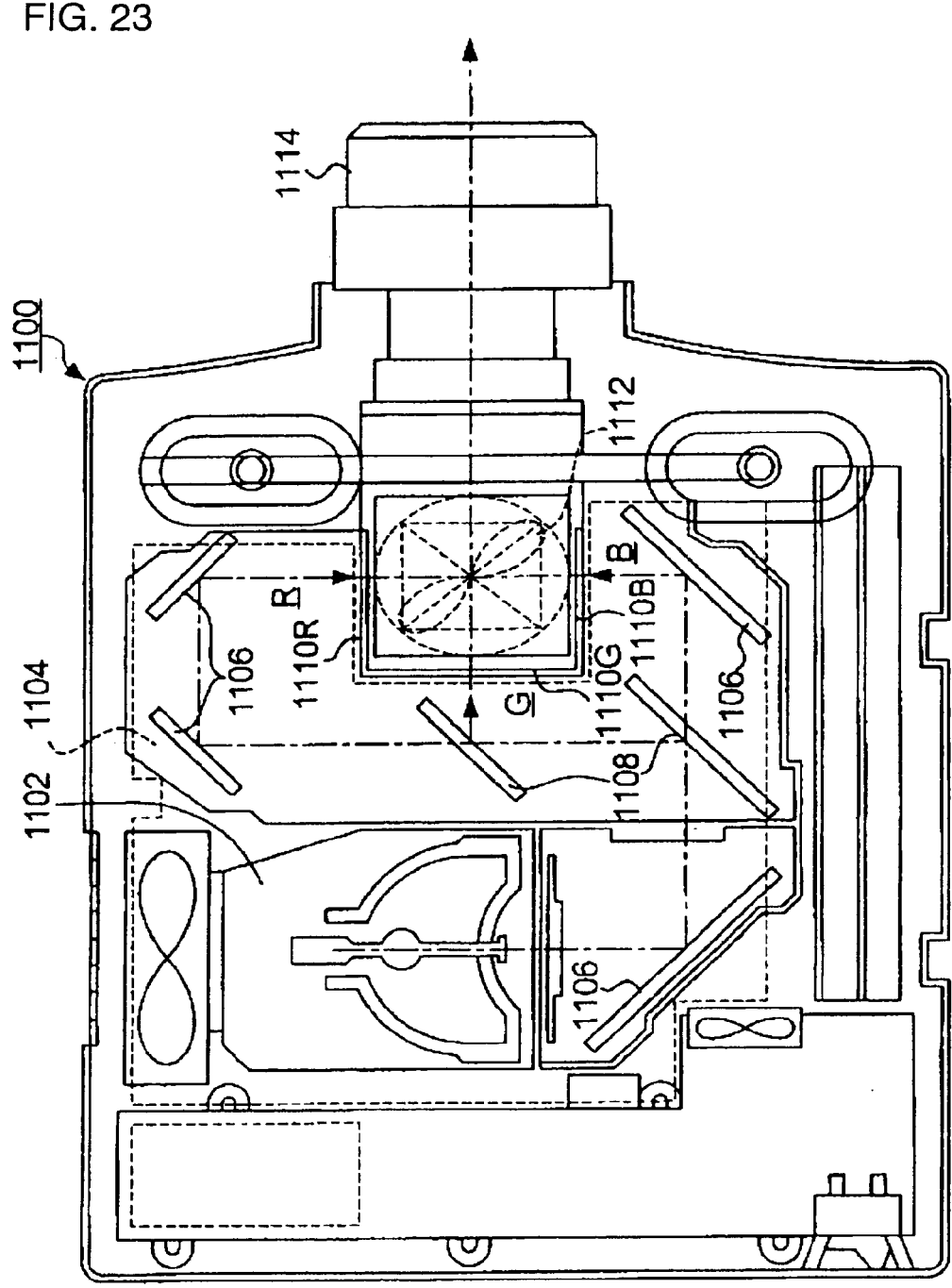
FIG. 23 is a sectional view of a video projector, which is an example of an electronic device to which the liquid-crystal device is applied.

First, a projector in which this liquid-crystal device is used as a light valve is described. FIG. 23 is a sectional view showing an example of the construction of a projector.

As shown in this figure, a projector 1100 is internally provided with a lamp unit 1102 formed of a white light source, such as a halogen lamp. The projected light emitted from this lamp unit 1102 is separated into the three primary colors of RGB by four mirrors 1106 and two dichroic mirrors 1108 which are arranged inside a light guide 1104, and these primary colors are made to enter the liquid-crystal panels 1110R, 1110G, and 1110B as light valves corresponding to the primary colors, respectively.

The construction of the liquid-crystal panels 1110R, 1110G, and 1110B is the same as that of the above-described liquid-crystal panel 100, and the liquid-crystal panels are driven in accordance with the primary color signals of R, G, and B supplied from an image signal processing circuit (not shown), respectively. The light which is modulated by these liquid-crystal panels enters a dichroic prism 1112 from three directions. In this dichroic prism 1112, the R and B light is refracted by 90 degrees, whereas the G light travels straight. As a result of images of each color being combined, a color image is projected onto a screen, etc., via a projection lens 1114.

Here, when the display images by the respective liquid-crystal panels 1110R, 1110G, and 1110B are considered, the display image by the liquid-crystal panel 1110G needs to be bilaterally inverted with respect to the display images by the liquid-crystal panels 1110R and 1110B.

Since light corresponding to each primary color of RGB enters the liquid-crystal panels 1110R, 1110G, and 1110B by means of the dichroic mirrors 1108, there is no need to provide color filters therein.

Figure 24:
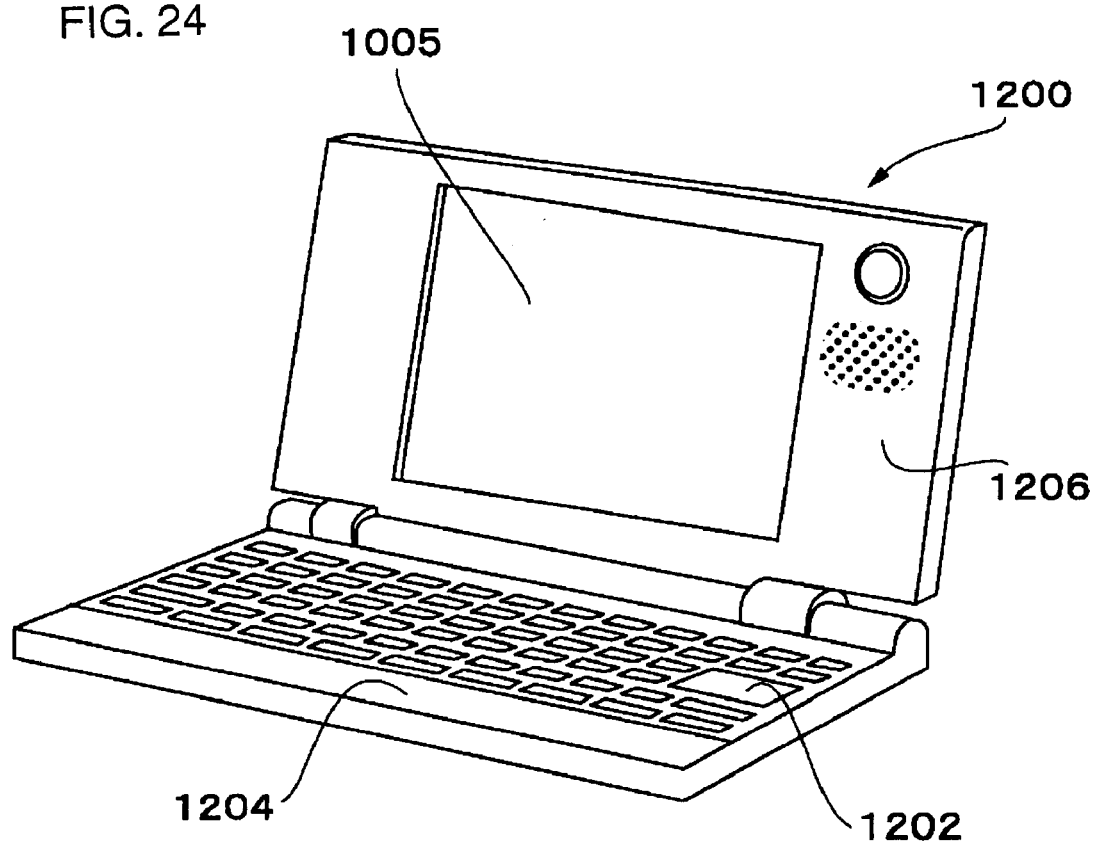
FIG. 24 is a perspective view showing the construction of a personal computer to which the liquid-crystal device is applied.

Next, a description is given of an example in which this liquid-crystal panel is applied to a mobile personal computer. FIG. 24 is a perspective view showing the construction of this personal computer. In the figure, a computer 1200 can include comprises a main-unit section 1204 including a keyboard 1202, and a liquid-crystal unit 1206. This liquid-crystal unit 1206 is constructed by adding a backlight in the rear of the above-described liquid-crystal display panel 100.

Figure 25:
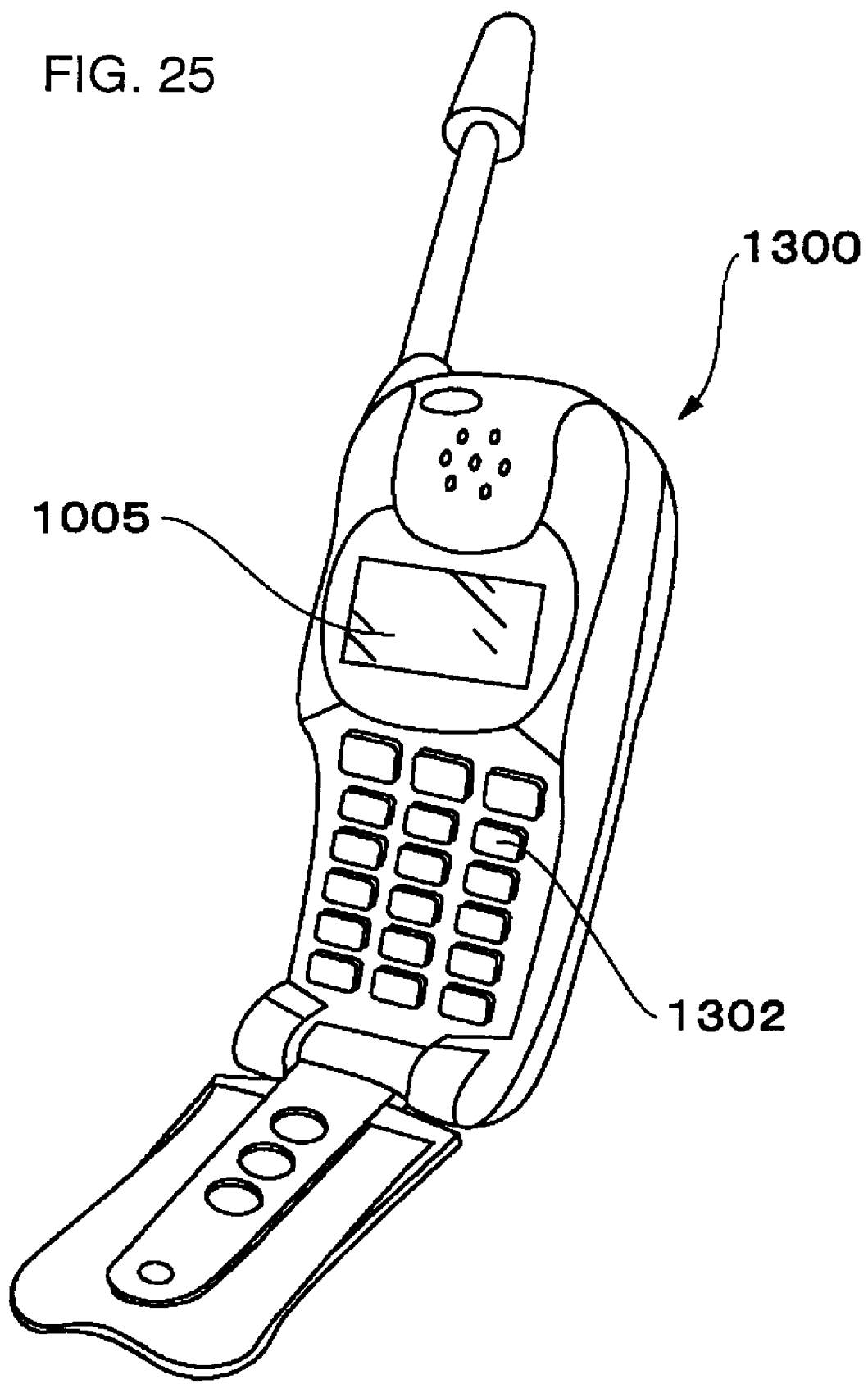
FIG. 25 is a perspective view showing the construction of a portable phone to which the liquid-crystal device is applied.
Figure 26:
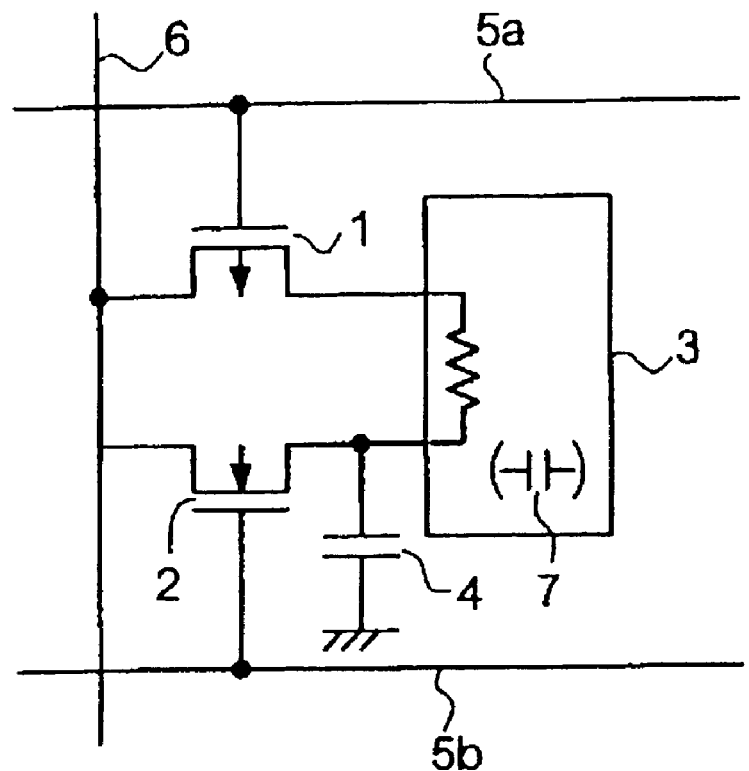
FIG. 26 is an exemplary circuit diagram showing a circuit corresponding to one pixel of a component substrate used in a conventional liquid-crystal device.
Figure 27:
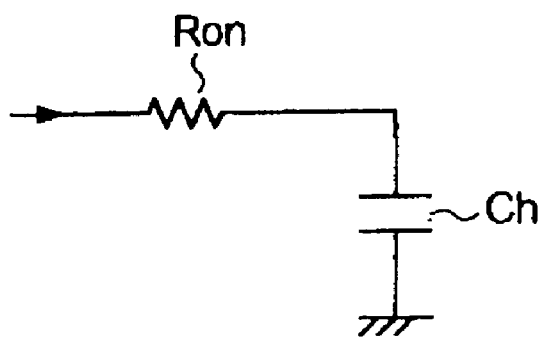
FIG. 27 is an exemplary circuit diagram showing an equivalent circuit for the case in which, in the pixel, an image signal is written into a holding capacitor via an N-channel TFT 2.
Figure 28:
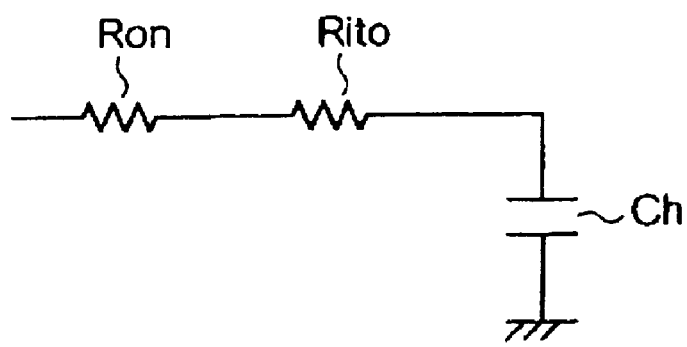
FIG. 28 is an exemplary circuit diagram showing an equivalent circuit for the case in which, in the pixel, an image signal is written into a holding capacitor via a P-channel TFT 1.

Furthermore, a description is given of an example in which this liquid-crystal display panel 100 is applied to a portable phone. FIG. 25 is a perspective view showing the construction of this portable phone. In the figure, a portable phone 1300 can include a plurality of operation buttons 1302, and a transmission-type liquid-crystal display panel 1005. In this transmission-type liquid-crystal display panel 1005, a front light is provided as necessary on the front side thereof.

In addition to the electronic devices described with reference to FIGS. 23 to 25, examples of the electronic devices can also include a liquid-crystal television, a viewfinder-type/monitor-direct-view-type video tape recorder, a car navigation apparatus, a pager, an electronic notebook, an electronic calculator, a word processor, a work station, a television phone, a POS terminal, a device having a touch panel and the like. It is to be understood that the present invention can be applied to these and other types of electronic devices.

As has thus been described, according to the electro-optical panel of the present invention, since a wiring for causing the drain electrodes of a first transistor element and a second transistor element to be short-circuited, the time constant when an image signal is written into a holding capacitor can be decreased, and a large contrast ratio can be obtained.

What is claimed is:

1. An electro-optical panel having a component substrate, an opposing substrate, and an electro-optical material disposed therebetween, said component substrate comprising:
   a plurality of pairs of scanning lines and a plurality of data lines, the pairs scanning lines and data lines being arranged in a matrix;
   a plurality of pixel electrodes that are disposed in a matrix corresponding to intersections of said scanning lines and said data lines, each pixel electrode being positioned between one of said scanning lines of a pair of scanning lines and the other of said scanning lines of the pair of scanning lines;
   a first transistor element having a first gate electrode that is connected to one of said scanning lines of the pair of scanning lines, a first source electrode that is connected to said data lines, and a first drain electrode that is connected to said pixel electrode;
   a second transistor element having a second gate electrode that is connected to the other one of said scanning lines of the pair of scanning lines, a second source electrode that is connected to said data lines, and a second drain electrode that is connected to said pixel electrode;
   a capacitance element which is connected to the second drain electrode; and
   a wire which has resistance and directly connects the first drain electrode through a first contact hole to the second drain electrode through another first contact hole.

2. An electro-optical panel according to claim 1, the resistance of the wire being smaller than an equivalent resistance of said pixel electrode which connects the first drain electrode to the second drain electrode.

3. An electro-optical panel according to claim 1, a common electrode and a lattice-shaped black matrix being formed on said opposing substrate, and the wire being arranged in such a manner as to overlap with said black matrix.

4. An electro-optical panel having a component substrate, an opposing substrate, and an electro-optical material disposed therebetween, said component substrate comprising:
   a plurality of pairs of scanning lines and a plurality of data lines, the scanning lines and data lines being arranged in a matrix;
   a plurality of pixel electrodes that are disposed in a matrix corresponding to intersections of said scanning lines and said data lines, each pixel electrode being positioned between one of said scanning lines of a pair of scanning lines and the other of said scanning lines of the pair of scanning lines;
   a first transistor element in which one of said scanning lines in the pair is connected to a first gate electrode, and said data lines are connected to a first source electrode;
   a second transistor element in which the other of said scanning lines provided in the pair is connected to a second gate electrode, and said data lines are connected to a second source electrode; and
   a wire which has resistance and directly connects the first drain electrode through a first contact hole to the second drain electrode through another first contact hole, said wire is connected to said pixel electrode.

5. An electro-optical panel according to claim 4, including a capacitance element which is connected to the second drain electrode.

6. An electro-optical panel according to claim 1, said first and second transistor elements further comprising a polysilicon layer formed of a source region, a gate region, and a drain region, and a gate insulating film formed on said polysilicon layer,
   said drain electrode being connected to said drain region via a first contact hole formed in said gate insulating film,
   said pixel electrode and said drain electrode being connected to each other via a second contact hole, and
   the resistance of said wire being smaller than the equivalent resistance of said first contact hole or the equivalent resistance of said second contact hole.

7. An electro-optical panel according to claim 4, said first and second transistor elements further comprising a polysilicon layer formed of a source region, a gate region, and a drain region, and a gate insulating film formed on said polysilicon layer,
   said drain electrode being connected to said drain region via a first contact hole formed in said gate insulating film,
   said pixel electrode and said drain electrode being connected to each other via a second contact hole,
   a common electrode and a lattice-shaped black matrix being formed on said opposing substrate, and
   said second contact hole being provided in such a manner as to overlap with said black matrix.

8. An electro-optical panel according to claim 1, said first transistor element comprising a P-type thin-film transistor element, and said second transistor element comprising an N-type thin-film transistor element.

9. An electro-optical panel according to claim 1, said first transistor element comprising an N-type thin-film transistor element, and said second transistor element comprising a P-type thin-film transistor element.

10. An electro-optical panel according to claim 8, said capacitance element being formed between a capacitor line formed in proximity to said other scanning line and the drain region of said second transistor element.

11. An electro-optical panel according to claim 1, said pixel electrode being formed of a light-transmitting conductive film.

12. An electro-optical panel according to claim 4, said pixel electrode being formed of a light-transmitting conductive film, having said electro-optical material side positioned on one of the sides thereof, and having a reflection layer which reflects incident light on the other side, and said wire being formed on a side opposite to said pixel electrode with respect to said reflection layer.

13. An electro-optical panel according to claim 12, an opening through which light is transmitted being provided in a portion of said reflection layer, and said wire being arranged in such a manner as not to overlap with said opening.

14. An electro-optical panel according claim 1, said pixel electrode being formed of a light-reflecting conductive film.

15. An electro-optical panel according to claim 1, a scanning-line driving circuit that selects said scanning lines in a pair in sequence, and a data-line driving circuit that supplies an image signal to each of said data lines being formed on said component substrate.

16. An electronic device comprising an electro-optical panel according to claim 15.

17. An electro-optical panel according to claim 4, said first and second transistor elements further comprising a polysilicon layer formed of a source region, a gate region, and a drain region, and a gate insulating film formed on said polysilicon layer, said drain electrode being connected to said drain region via a first contact hole formed in said gate insulating film, said pixel electrode and said drain electrode being connected to each other via a second contact hole, and the resistance of said wire being smaller than the equivalent resistance of said first contact hole or the equivalent resistance of said second contact hole.

18. An electro-optical panel according to claim 5, said first transistor element comprising a P-type thin-film transistor element, and said second transistor element comprising an N-type thin-film transistor element.

19. An electro-optical panel according to claim 5, said first transistor element comprising an N-type thin-film transistor element, and said second transistor element comprising a P-type thin-film transistor element.

20. An electro-optical panel according to claim 4, said pixel electrode being formed of a light-transmitting conductive film.

21. An electro-optical panel according claim 4, said pixel electrode being formed of a light-reflecting conductive film.

22. An electro-optical panel having a component substrate, an opposing substrate, and an electro-optical material disposed therebetween, said component substrate comprising:

a plurality of pairs of scanning lines and a plurality of data lines, the scanning lines and data lines being arranged in a matrix;

a plurality of pixel electrodes that are disposed in a matrix corresponding to intersections of said scanning lines and said data lines, each pixel electrode being positioned between one of said scanning lines of a pair of scanning lines and the other of said scanning lines of the pair of scanning lines;

a first transistor element in which one of said scanning lines in the pair is connected to a first gate electrode, and said data lines are connected to a first source electrode;

a second transistor element in which the other of said scanning lines provided in the pair is connected to a second gate electrode, and said data lines are connected to a second source electrode;

a wire which has resistance and directly connects the first drain electrode through a first contact hole to the second drain electrode through another first contact hole, said wire is connected to said pixel electrode; and a capacitance element which is connected to the second drain electrode.

23. An electro-optical panel having a component substrate, an opposing substrate, and an electro-optical material disposed therebetween, said component substrate comprising:

a plurality of pairs of scanning lines and a plurality of data lines, the scanning lines and data lines being arranged in a matrix;

a plurality of pixel electrodes that are disposed in a matrix corresponding to intersections of said scanning lines and said data lines, each pixel electrode being positioned between one of said scanning lines of a pair of scanning lines and the other of said scanning lines of the pair of scanning lines;

a first transistor element in which one of said scanning lines in the pair is connected to a first gate electrode, and said data lines are connected to a first source electrode;

a second transistor element in which the other of said scanning lines provided in the pair is connected to a second gate electrode, and said data lines are connected to a second source electrode;

a wire which has resistance and directly connects the first drain electrode through a first contact hole to the second drain electrode through another first contact hole, said wire is connected to said pixel electrode, said pixel electrode being formed of a light-transmitting conductive film, having said electro-optical material side positioned on one of the sides thereof, and having a reflection layer which reflects incident light on the other side, said wire being formed on a side opposite to said pixel electrode with respect to said reflection layer, an opening through which light is transmitted being provided in a portion of said reflection layer; and said wire being arranged in such a manner as not to overlap with said opening.

24. An electro-optical panel having a component substrate, an opposing substrate, and an electro-optical material disposed therebetween, said component substrate comprising:

a plurality of pairs of scanning lines and a plurality of data lines, the scanning lines and data lines being arranged in a matrix;

a plurality of pixel electrodes that are disposed in a matrix corresponding to intersections of said scanning lines and said data lines, each pixel electrode being positioned between one of said scanning lines of a pair of scanning lines and the other of said scanning lines of the pair of scanning lines;

a first transistor element in which one of said scanning lines in the pair is connected to a first gate electrode, and said data lines are connected to a first source electrode;

a second transistor element in which the other of said scanning lines provided in the pair is connected to a second gate electrode, and said data lines are connected to a second source electrode;

a wire which has resistance and directly connects the first drain electrode through a first contact hole to the second drain electrode through another first contact hole, said wire is connected to said pixel electrode; and a common electrode and a lattice-shaped black matrix being formed on said opposing substrate, and said wire being arranged in such a manner as to overlap with said black matrix.

* * * * *